(12) United States Patent
Reynolds

(10) Patent No.: US 11,793,176 B2
(45) Date of Patent: Oct. 24, 2023

(54) ARC MODULAR LIGHT DEVICES, SYSTEMS, AND METHODS

(71) Applicant: ABL Research Group, LLC, Sarasota, FL (US)

(72) Inventor: Robert Reynolds, Bradenton, FL (US)

(73) Assignee: ABL Research Group, LLC, Sarasota, FL (US)

( * ) Notice: Subject to any disclaimer, the term of this patent is extended or adjusted under 35 U.S.C. 154(b) by 0 days.

(21) Appl. No.: 17/517,611

(22) Filed: Nov. 2, 2021

(65) Prior Publication Data

US 2022/0201991 A1 Jun. 30, 2022

Related U.S. Application Data

(63) Continuation of application No. 16/821,787, filed on Mar. 17, 2020, now Pat. No. 11,160,259, which is a
(Continued)

(51) Int. Cl.
| | |
|---|---|
| *F21V 21/15* | (2006.01) |
| *F21V 5/00* | (2018.01) |
| *F21V 31/00* | (2006.01) |
| *F21V 29/67* | (2015.01) |
| *F21V 29/74* | (2015.01) |
| *A01K 63/06* | (2006.01) |
| *F21S 2/00* | (2016.01) |
| *F21V 17/00* | (2006.01) |

(Continued)

(52) U.S. Cl.
CPC ............ *A01K 63/06* (2013.01); *B60Q 1/0483* (2013.01); *B60Q 1/0683* (2013.01); *B60Q 1/18* (2013.01); *B60Q 1/24* (2013.01); *F21K 9/00* (2013.01); *F21S 2/005* (2013.01); *F21S 4/22* (2016.01); *F21V 5/007* (2013.01); *F21V 17/002* (2013.01); *F21V 19/04* (2013.01); *F21V 21/15* (2013.01); *F21V 29/673* (2015.01); *F21V 29/74* (2015.01); *F21V 31/005* (2013.01); *G02B 27/30* (2013.01); *F21Y 2103/00* (2013.01); *F21Y 2107/10* (2016.08); *F21Y 2107/70* (2016.08); *F21Y 2115/10* (2016.08); *H05B 45/10* (2020.01); *Y02A 40/25* (2018.01); *Y02P 60/14* (2015.11)

(58) Field of Classification Search
CPC ...... F21V 31/005; F21V 19/04; F21V 17/002; F21V 5/007; F21V 2/005; F21S 4/22
See application file for complete search history.

(56) References Cited

U.S. PATENT DOCUMENTS

| | | |
|---|---|---|
| 7,226,185 B2 | 6/2007 | Dolgin et al. |
| 8,047,680 B2 | 11/2011 | Huang et al. |
| | (Continued) | |

*Primary Examiner* — Anabel Ton
(74) *Attorney, Agent, or Firm* — Reichel Stohry Dean LLP; Mark C. Reichel; Natalie J. Dean

(57) ABSTRACT

Arc modular light devices, systems, and methods. In at least one exemplary embodiment of a module system of the present disclosure, the module system comprises a plurality of LED modules, each LED module comprising an outer housing, a light source positioned within the outer housing, and a lens positioned so that light from the light source can be emitted through the lens; and a plate configured to couple to each of the plurality of LED modules; wherein the module system is configured to focus light from the LED modules inward when the plate has a concave curvature; and wherein the module system is configured to spread light from the LED modules outward when the plate has a convex curvature.

13 Claims, 25 Drawing Sheets

Related U.S. Application Data continuation of application No. 16/365,440, filed on Mar. 26, 2019, now Pat. No. 10,591,149, which is a continuation of application No. 15/696,024, filed on Sep. 5, 2017, now Pat. No. 10,240,765, which is a continuation-in-part of application No. 14/337,005, filed on Jul. 21, 2014, now Pat. No. 9,995,472.

(60) Provisional application No. 62/383,015, filed on Sep. 2, 2016, provisional application No. 61/858,460, filed on Jul. 25, 2013.

(51) Int. Cl.

| | | |
|---|---|---|
| *G02B 27/30* | (2006.01) | |
| *F21K 9/00* | (2016.01) | |
| *F21V 19/04* | (2006.01) | |
| *B60Q 1/04* | (2006.01) | |
| *B60Q 1/068* | (2006.01) | |
| *B60Q 1/18* | (2006.01) | |
| *B60Q 1/24* | (2006.01) | |
| *F21S 4/22* | (2016.01) | |
| *F21Y 115/10* | (2016.01) | |
| *F21Y 107/10* | (2016.01) | |
| *F21Y 103/00* | (2016.01) | |
| *F21Y 107/70* | (2016.01) | |
| *H05B 45/10* | (2020.01) | |

(56) References Cited

U.S. PATENT DOCUMENTS

| | | |
|---|---|---|
| 8,061,869 B2 | 11/2011 | Lo |
| 8,317,363 B2 | 11/2012 | Zheng |
| 8,434,899 B2 | 5/2013 | Lee |
| 8,979,303 B2 | 3/2015 | Adams |
| 9,470,378 B2 | 10/2016 | Kim |
| 9,869,456 B2 | 1/2018 | Speer |
| 2002/0060910 A1 | 5/2002 | Knight |
| 2004/0001344 A1 | 1/2004 | Hecht |
| 2005/0068777 A1 | 3/2005 | Popovic |
| 2008/0080189 A1 | 4/2008 | Wang |
| 2010/0118534 A1 | 5/2010 | Lo |
| 2010/0321952 A1 | 12/2010 | Coleman et al. |
| 2012/0182755 A1 | 7/2012 | Wildner |
| 2012/0206918 A1 | 8/2012 | Lee et al. |
| 2014/0049956 A1 | 2/2014 | Manahan |
| 2014/0078762 A1 | 3/2014 | Adams et al. |
| 2014/0168991 A1 | 6/2014 | Kim |
| 2015/0247612 A1 | 9/2015 | Zhang et al. |

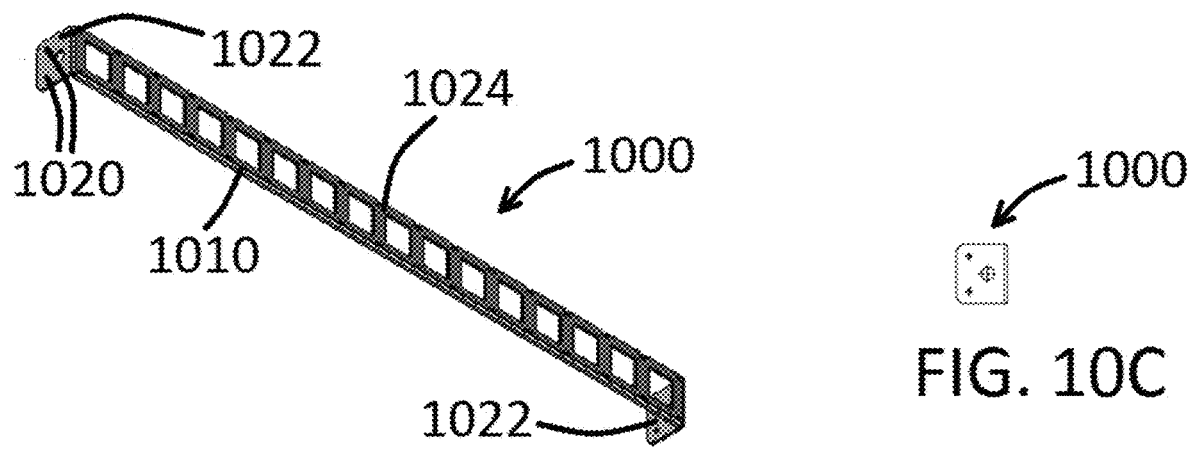
FIG. 10A
FIG. 10C
FIG. 10B
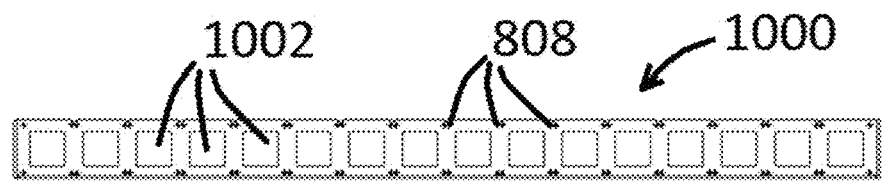
FIG. 10D

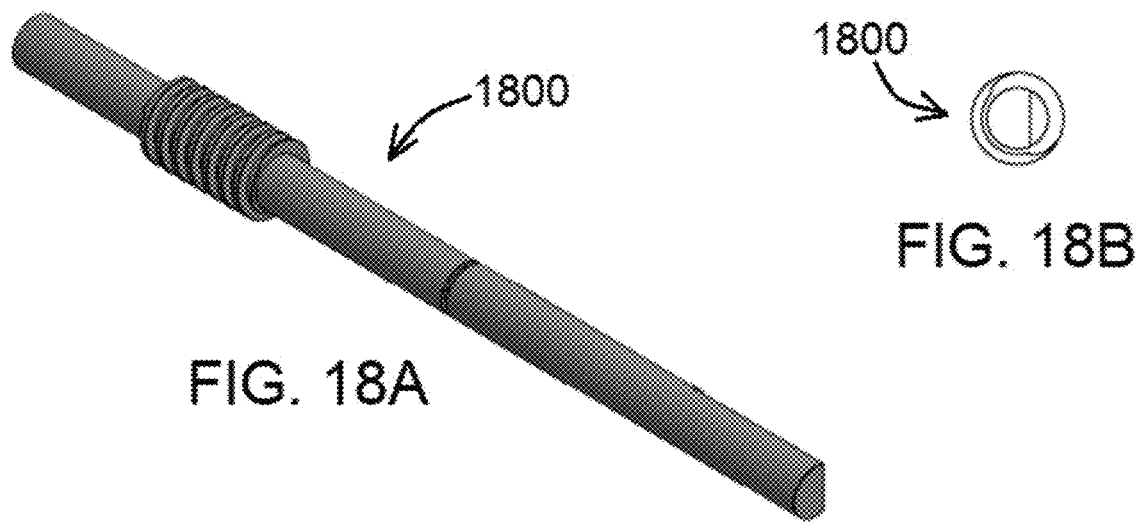
FIG. 18A
FIG. 18B
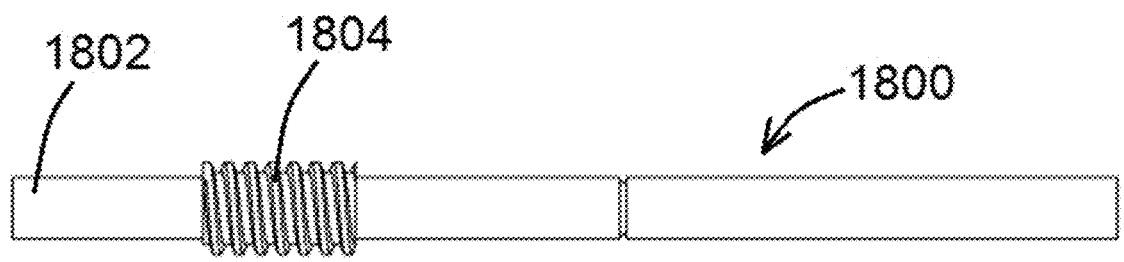
FIG. 18C
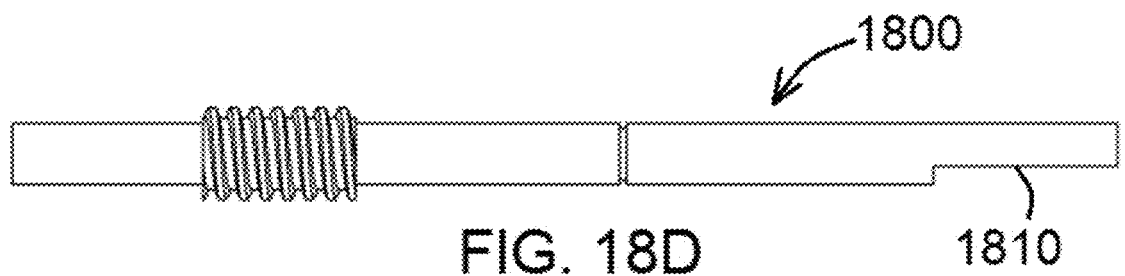
FIG. 18D

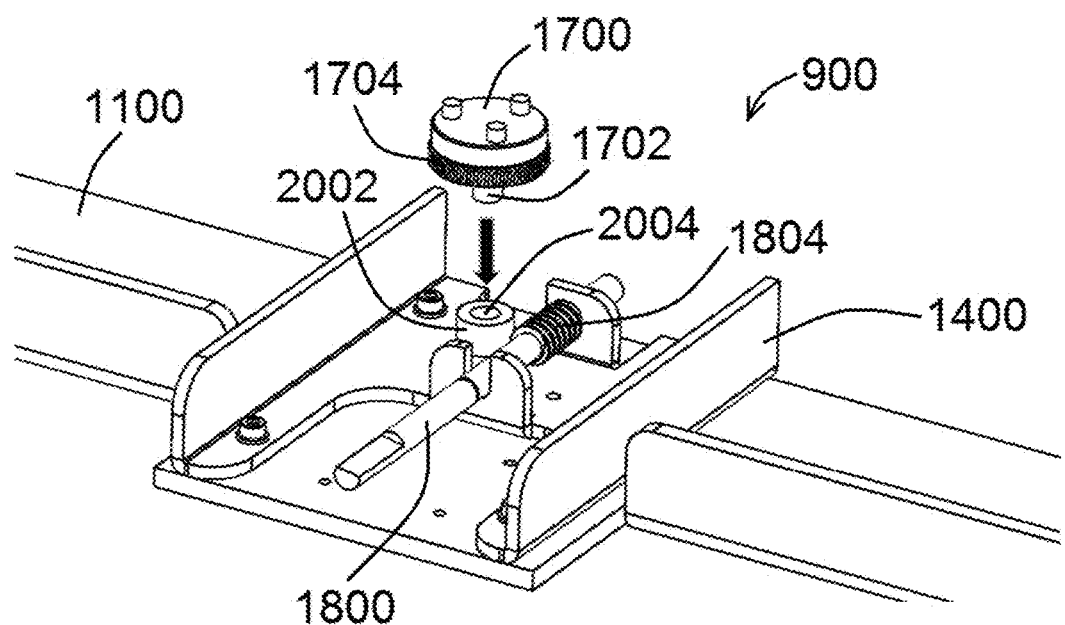
FIG. 21A
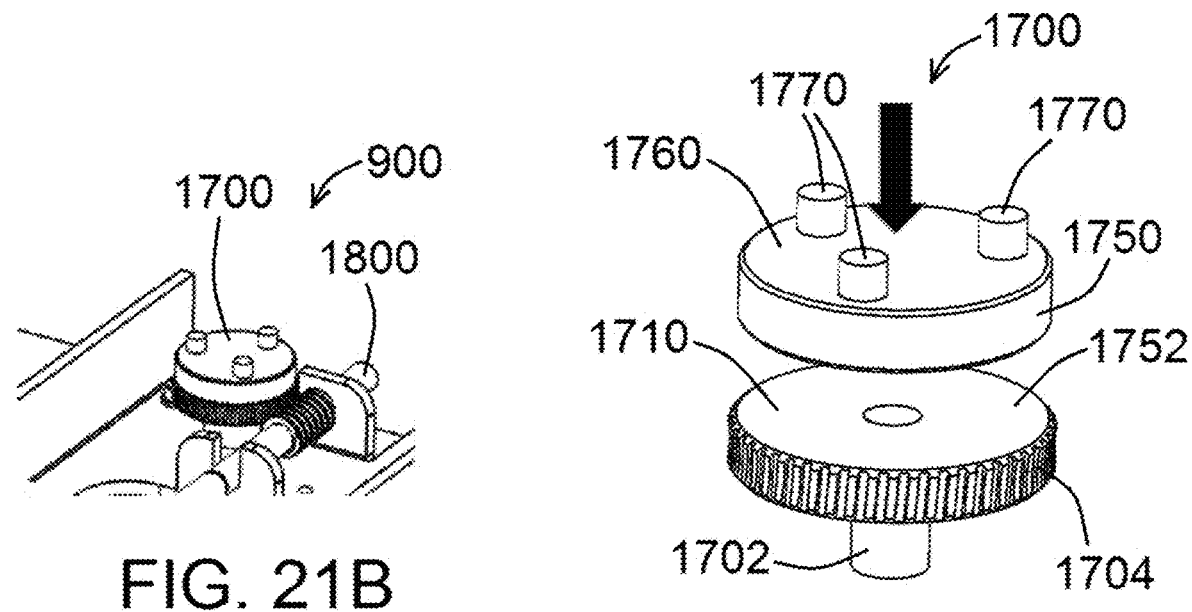
FIG. 21B
FIG. 21C

ARC MODULAR LIGHT DEVICES, SYSTEMS, AND METHODS

PRIORITY

This present application is related to, claims the priority benefit of, and is a U.S. continuation patent application of, U.S. Nonprovisional patent application Ser. No. 16/821,787, filed Mar. 17, 2020 and issued as U.S. Pat. No. 11,160,259 on Nov. 2, 2021, which is related to, claims the priority benefit of, and is a U.S. continuation patent application of, U.S. Nonprovisional patent application Ser. No. 16/365,440, filed Mar. 26, 2019 and issued as U.S. Pat. No. 10,591,149 on Mar. 17, 2020, which is related to, and claims the priority benefit of, U.S. Nonprovisional patent application Ser. No. 15/696,024, filed Sep. 5, 2017 and issued as U.S. Pat. No. 10,240,765 on Mar. 26, 2019, which a) is related to, and claims the priority benefit of, U.S. Provisional Patent Application Ser. No. 62/383,015, filed Sep. 2, 2016, and b) is related to, claims the priority benefit of, and is a U.S. continuation-in-part patent application of, U.S. Nonprovisional patent application Ser. No. 14/337,005, filed Jul. 21, 2014 and issued as U.S. Pat. No. 9,995,472 on Jun. 12, 2018, which is related to, and claims the priority benefit of, U.S. Provisional Application Ser. No. 61/858,460, filed Jul. 25, 2013. The contents of each of the foregoing patent applications are incorporated herein directly and by reference in their entirety.

TECHNICAL FIELD

Embodiments disclosed herein relate generally to light fixtures, and in particular to LED light fixtures.

BACKGROUND

Recent decades have seen an accelerating shift toward the use of light-emitting diodes (LEDs) in light fixtures. Compared to other forms of electrical light, such as fluorescent and incandescent lighting, LEDs are extremely energy efficient, reducing electrical bills and reducing the environmental impact of energy used for lighting. LEDs also have much longer useful lifespans than most other forms of electrical lighting, especially when compared to lighting suitable for indoor use. In the past LEDs also had certain disadvantages, such as the tendency to emit light in narrow ranges of wavelengths, often seeming monochromatic, and difficulty matching the luminous power of incandescent and fluorescent lights. As the use of LEDs has expanded, firms across the globe have raced to improve LEDs, shoring up many of their traditional weaknesses. LEDs that produce more lumens and LEDs that produce broader spectra of light have become increasingly ubiquitous and inexpensive. Nonetheless, where a high luminous output, a broad spectrum of wavelengths, or both are desired, LEDs still cannot match competing technologies. For instance, indoor horticulture using artificial light requires high-intensity light with a broad range of wavelengths as a substitute for the sunlight plants naturally crave. Currently available LED fixtures often fail to achieve those requirements, forcing indoor horticulturalists to select less energy-efficient options.

BRIEF SUMMARY

According to one aspect, a modular lighting fixture includes a housing having a front panel, the front panel having a radius of curvature, and a plurality of LED modules disposed adjacent the front panel. Each of the LED modules includes a heat sink, an LED source mounted to the heat sink, and a lens disposed over the LED source, the lens capable of refracting light emitted by the LED source into a desired distribution pattern. The plurality of LED modules produce a concentrated illuminated area at a pre-determined distance from the front panel as determined by the radius of curvature of the front panel. The heat sink of each LED module may have an internal volume defined by a closed end, a sidewall, and an open end, and the LED source may be mounted within the volume and positioned to emit light toward the open end.

In an additional aspect, the LED source of at least one of the plurality of LED modules further includes at least one light-emitting diode configured to emit red light, at least one light-emitting diode configured to emit orange light, and at least one light-emitting diode configured to emit blue light. In another aspect, the LED source of at least one of the plurality of LED modules further includes at least one light-emitting diode configured to emit red light, at least one light-emitting diode configured to emit green light, and at least one light-emitting diode configured to emit blue light. The LED source of at least one of the plurality of LED modules may also include at least one light-emitting diode configured to emit broad-spectrum white light. At least one of the plurality of LED modules may include a color mixing lens disposed between the LED source and collimating lens; the collimating lens may be a color-mixing lens. The lens may be removably attached to the heat sink, so that different lenses may be substituted within the LED module. The fixture includes four LED modules in one embodiment.

In an additional aspect, the fixture further includes at least one controller to regulate the voltage and current supplied to the LED sources in the plurality of LED modules. The at least one controller may be a controller incorporated in each LED module. The fixture may include a dimmer switch configured to permit the user to adjust the intensity of light emitted from at least one LED module. The fixture may also include at least one cooling fan positioned to force ambient air across the heat sinks of the plurality of LED modules; the at least one cooling fan may be a cooling fan incorporated in each LED module. The fixture may include a means of adjusting an angle of aim of a specific LED module relative to the front panel.

In another aspect, a lighting fixture includes a plurality of modular units, each modular unit including a front panel, the front panel having a radius of curvature and a plurality of LED modules disposed within the housing adjacent the front panel. Each LED module comprises a heat sink, an LED source mounted to the heat sink, and a lens disposed over the LED source, the lens capable of refracting light emitted by the LED source into a desired distribution pattern, wherein the plurality of LED modules produce a concentrated illuminated area at a pre-determined distance from the front panel as determined by the radius of curvature of the front panel. The plurality of modular units may be removably attached to one another to form an array of LED modules. All of the modular units may be arranged to converge their respective emitted light distribution patterns around the same illuminated area. The fixture may also include a means of adjusting the position and attitude of one modular unit relative to another. Each modular unit may have a power interconnect enabling the plurality of modular units to be electrically connected.

Other aspects, embodiments and features of the light fixture will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the light fixture.

In at least one exemplary embodiment of a module system of the present disclosure, the module system comprises a plurality of LED modules, each LED module comprising an outer housing, a light source positioned within the outer housing, and a lens positioned so that light from the light source can be emitted through the lens; and a flexible plate configured to couple to each of the plurality of LED modules; wherein the module system is configured to focus light from the LED modules inward when the flexible plate is curved in a first direction; and wherein the module system is configured to spread light from the LED modules outward when the flexible plate is curved in a second direction opposite the first direction.

In at least one exemplary embodiment of a module system of the present disclosure, each of the plurality of LED modules and the flexible plate define fastener apertures therein, and wherein a plurality of fasteners can be positioned within the fastener apertures to secure each of the plurality of LED modules to the flexible plate. In at least one exemplary embodiment of a module system of the present disclosure, the flexible plate is configured to couple to a substrate, the substrate selected from the group consisting of a rigid beam, a vehicle, and a building.

In at least one exemplary embodiment of a module system of the present disclosure, the module system further comprises a rigid beam coupled to the flexible plate, the rigid beam configured to attach to a vehicle or a building and further configured to retain the flexible plate while the flexible plate is in a straight configuration or a curved configuration.

In at least one exemplary embodiment of a module system of the present disclosure, the module system further comprises a pusher comprising a pusher bar extending from a pusher base, the pusher configured to contact the flexible plate to cause the flexible plate to bend from a bent or straight configuration or to cause the flexible plate to straighten from a bent configuration.

In at least one exemplary embodiment of a module system of the present disclosure, the module system further comprises a mechanism cradle coupled to the rigid beam and configured to receive the pusher. In at least one exemplary embodiment of a module system of the present disclosure, the module system further comprises a rotary push plate configured to engage the pusher; a gear assembly configured to engage a worm shaft so to facilitate movement of the pusher; and an adjustment knob configured to engage the worm shaft so that turning the adjustment knob causes the work shaft to rotate, which causes the gear assembly to rotate, and which causes pusher to move the flexible plate.

In at least one exemplary embodiment of a module system of the present disclosure, the module system further comprises a controller for providing power to each of the plurality of LED modules to power the light source within each LED module.

In at least one exemplary embodiment of a module system of the present disclosure, the module system is configured so to permit an LED module of the plurality of LED modules to be removed and replaced with another LED module while the remaining LED modules of the plurality of LED modules are operable to emit light therefrom.

In at least one exemplary embodiment of a module system of the present disclosure, the module system further comprises a motor in communication with the flexible plate, the motor powered by the controller; and a control module in communication with the motor; wherein operation of the motor, controlled using the control module, causes the flexible plate to bend from a bent or straight configuration or to cause the flexible plate to straighten from a bent configuration. In at least one exemplary embodiment of a module system of the present disclosure, the flexible plate can be manually or automatically curved or otherwise moved from a bent or straight configuration.

In at least one exemplary embodiment of a module system of the present disclosure, the module system comprises a plurality of LED modules, each LED module comprising an outer housing, a light source positioned within the outer housing, and a lens positioned so that light from the light source can be emitted through the lens; a flexible plate configured to couple to each of the plurality of LED modules; a rigid beam coupled to the flexible plate, the rigid beam configured to attach to a vehicle or a building and further configured to retain the flexible plate while the flexible plate is in a straight configuration or a curved configuration; and a controller for providing power to each of the plurality of LED modules to power the light source within each LED module; wherein the module system is configured to focus light from the LED modules inward when the flexible plate is curved in a first direction; and wherein the module system is configured to spread light from the LED modules outward when the flexible plate is curved in a second direction opposite the first direction.

In at least one exemplary embodiment of a module system of the present disclosure, the module system further comprises a pusher comprising a pusher bar extending from a pusher base, the pusher configured to contact the flexible plate to cause the flexible plate to bend from a bent or straight configuration or to cause the flexible plate to straighten from a bent configuration; and a mechanism cradle coupled to the rigid beam and configured to receive the pusher.

In at least one exemplary embodiment of a module system of the present disclosure, the module system is configured so to permit an LED module of the plurality of LED modules to be removed and replaced with another LED module while the remaining LED modules of the plurality of LED modules are operable to emit light therefrom.

In at least one exemplary embodiment of a module system of the present disclosure, the module system further comprises a motor in communication with the flexible plate, the motor powered by the controller; and a control module in communication with the motor; wherein operation of the motor, controlled using the control module, causes the flexible plate to bend from a bent or straight configuration or to cause the flexible plate to straighten from a bent configuration.

In at least one exemplary embodiment of a module system of the present disclosure, the module system further comprises a remote configured to communicate with the control module and further configured to control operation of the control module. In at least one exemplary embodiment of a module system of the present disclosure, the flexible plate can be manually or automatically curved or otherwise moved from a bent or straight configuration. In at least one exemplary embodiment of a module system of the present disclosure, each of the plurality of LED modules and the flexible plate define fastener apertures therein, and wherein a plurality of fasteners can be positioned within the fastener apertures to secure each of the plurality of LED modules to the flexible plate. In at least one exemplary embodiment of a module system of the present disclosure, each of the plurality of LED modules are waterproof.

In at least one exemplary embodiment of a kit of the present disclosure, the kit comprises a plurality of LED modules, each LED module comprising an outer housing, a light source positioned within the outer housing, and a lens positioned so that light from the light source can be emitted through the lens; a flexible plate configured to couple to each of the plurality of LED modules; a rigid beam configured to couple to the flexible plate, the rigid beam configured to attach to a vehicle or a building and further configured to retain the flexible plate while the flexible plate is in a straight configuration or a curved configuration; and a controller for providing power to each of the plurality of LED modules to power the light source within each LED module.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIG. 10A shows a perspective view of an embodiment of a flexible plate, according to the present disclosure;

FIG. 10B shows a top view of an embodiment of a flexible plate, according to the present disclosure;

FIG. 10C shows a side view of an embodiment of a flexible plate, according to the present disclosure;

FIG. 10D shows a front view of an embodiment of a flexible plate, according to the present disclosure;

FIG. 18A shows a perspective view of a worm shaft, according to the present disclosure;

FIG. 18B shows a front view of a worm shaft, according to the present disclosure;

FIGS. 18C and 18D show side views of a worm shaft, according to the present disclosure;

FIG. 21A shows a gear assembly being installed into module system, according to the present disclosure;

FIG. 21B shows a gear assembly installed into module system, according to the present disclosure;

FIG. 21C shows portions of a gear assembly, according to the present disclosure;

Figure 1:
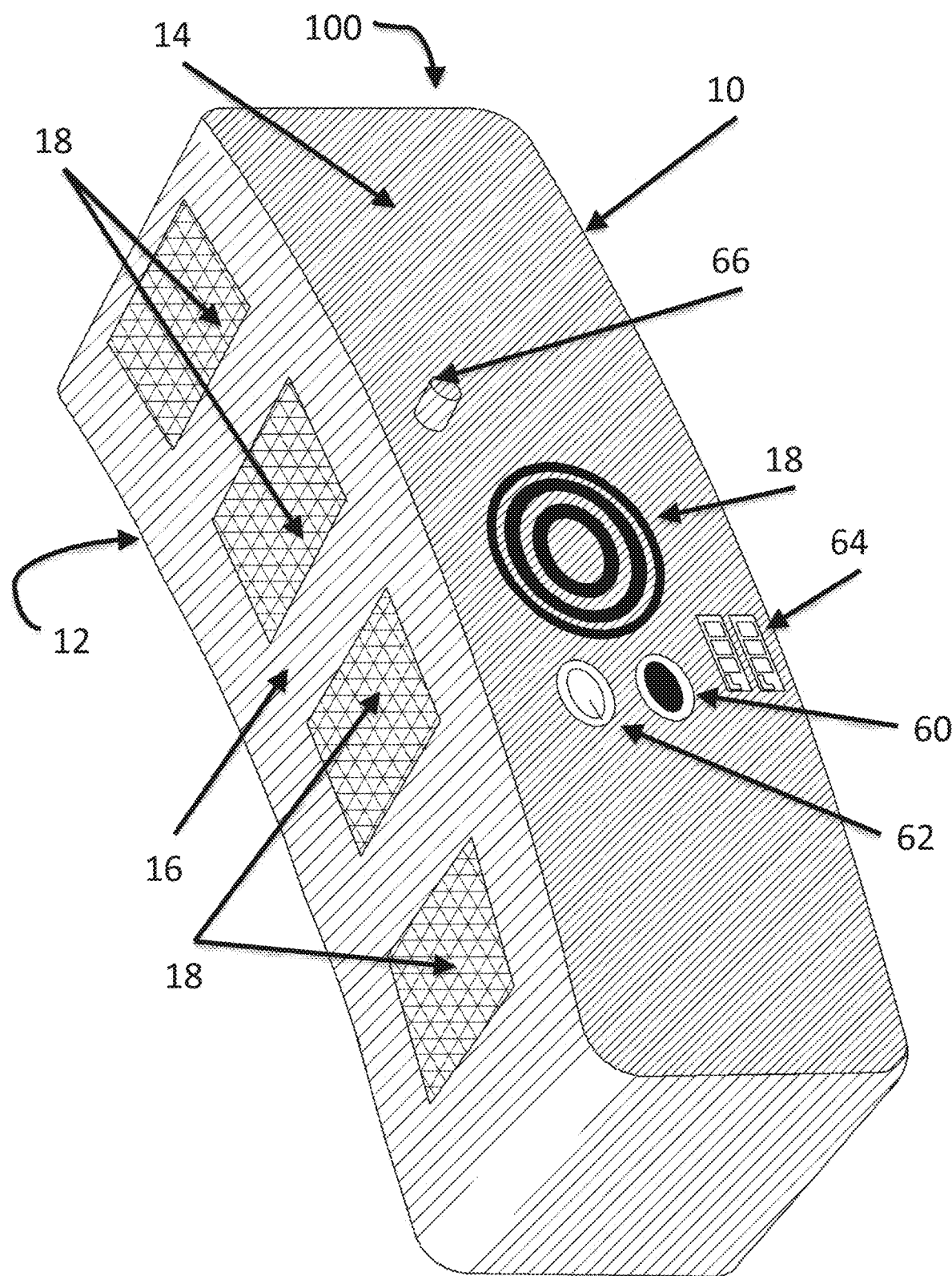
FIG. 1 shows an isometric view of an embodiment of an arc modular LED light fixture according to the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

The present application discloses various embodiments of an arc-shaped modular light emitting diode ("LED") light fixture and methods for using and constructing the same. According to one aspect of the present disclosure, an arc modular fixture array having a plurality of LED modules, suitable for horticulture, aquaculture, and general area light is disclosed. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows an arc modular LED light fixture 100 according to at least one embodiment of the present disclosure. As shown in FIG. 1, the fixture 100 may include a housing 10 having a back panel 14 and a front panel 12 joined together by one or more side panels 16. The front panel 12 may have a curved or arced shape in profile that defines a substantially uniform radius of curvature between the side panels 16. The back panel 14 may be similarly arced in profile, though the radius of the back panel 14 need not be identical to the radius of the front panel 12. In some embodiments, the back panel 14 may be substantially flat. The housing 10 may include one or more vents 18 formed therethrough to enable the flow of ambient air into, through, and out of the housing 10.

Figure 2:
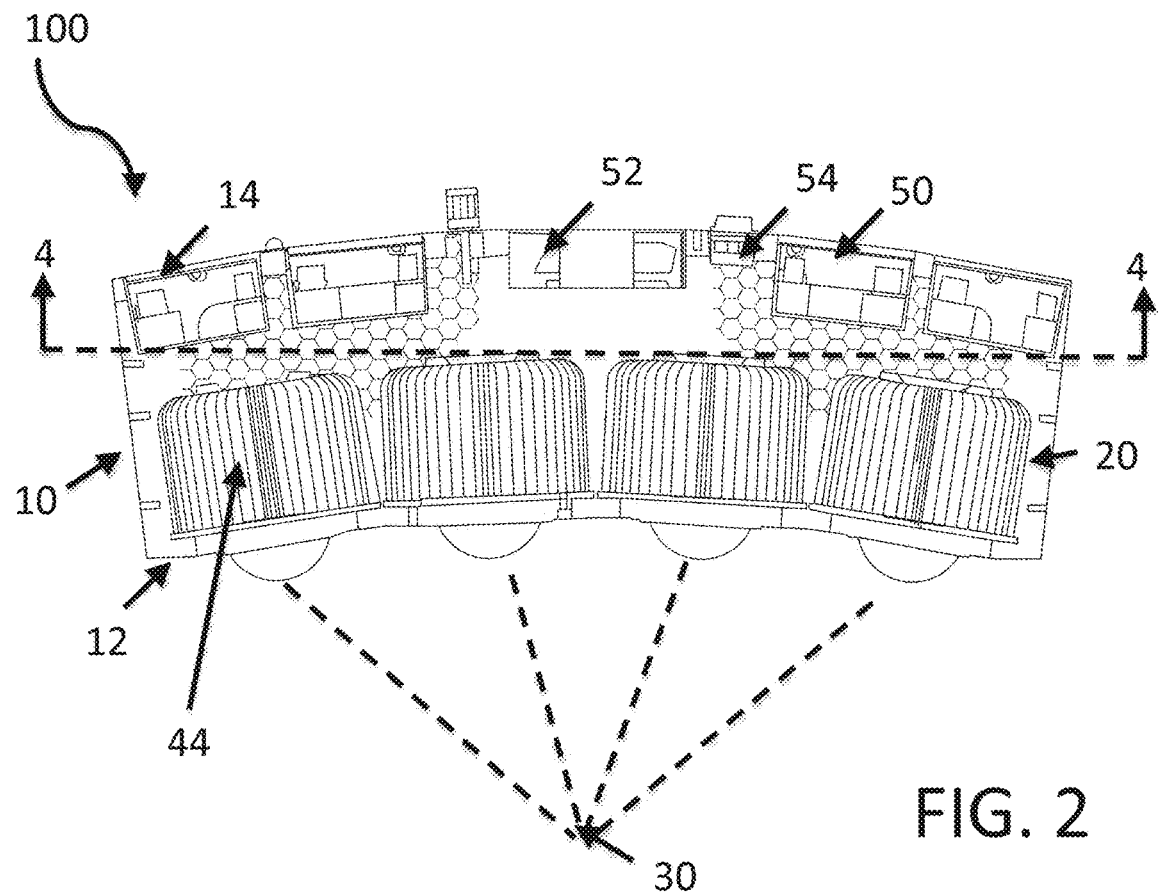
FIG. 2 shows a cut-away plan view of an embodiment of an arc modular LED light fixture according to the present disclosure.

FIG. 2 shows a cut-away plan view of the fixture according to the present disclosure. As shown in FIG. 2, the fixture 100 may include a plurality of LED modules 20 disposed within the housing 10 and mounted adjacent the front panel 12. Each LED module 20 is capable of generating or emitting a pre-determined light distribution pattern as described further herein. The plurality of LED modules 20 may be disposed adjacent the front panel 12 such that each LED module 20 is aimed or directed toward the same central point 30 of the radius of curvature of the front panel 12. In such an embodiment, the plurality of LED modules 20 may be arranged to converge their respective emitted light distribution patterns around the same center point 30, thereby generating a single, fully convergent distribution pattern with an intensity proportional to the number of individual LED modules 20. By generating a fully convergent distribution pattern, the fixture 100 enables a uniform illuminated area without lighting areas outside the intended area, which would result in inefficiencies.

Figure 3:
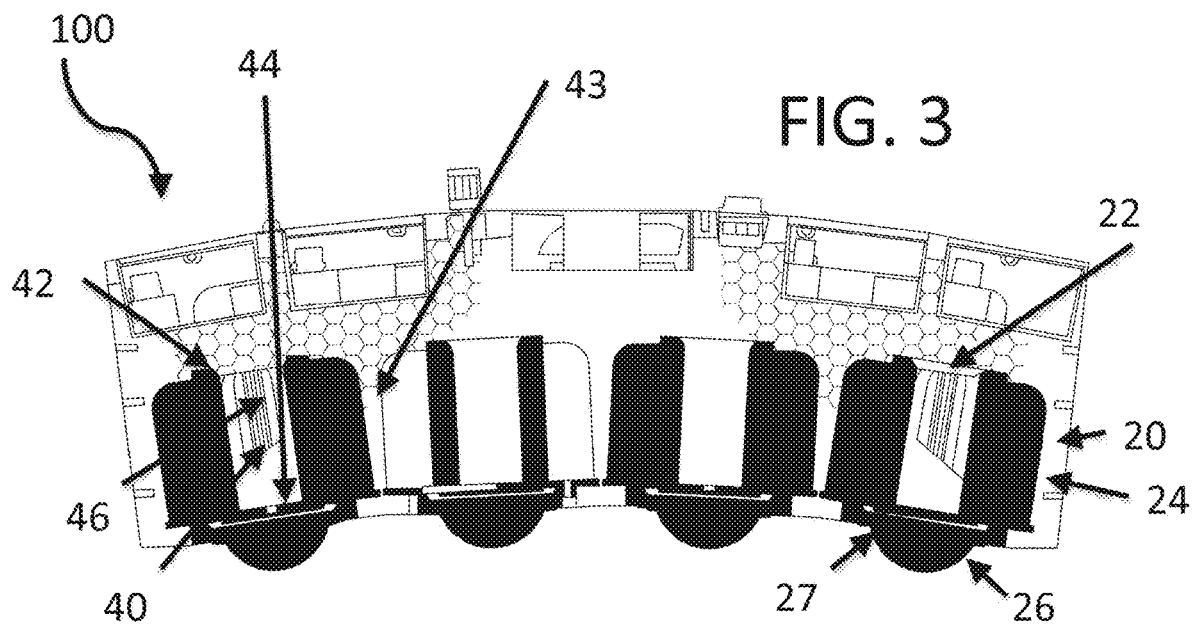
FIG. 3 shows a cross-sectional plan view taken at a plane 3-3 of the embodiment of the ark modular LED light fixture of FIG. 4.
Figure 4:
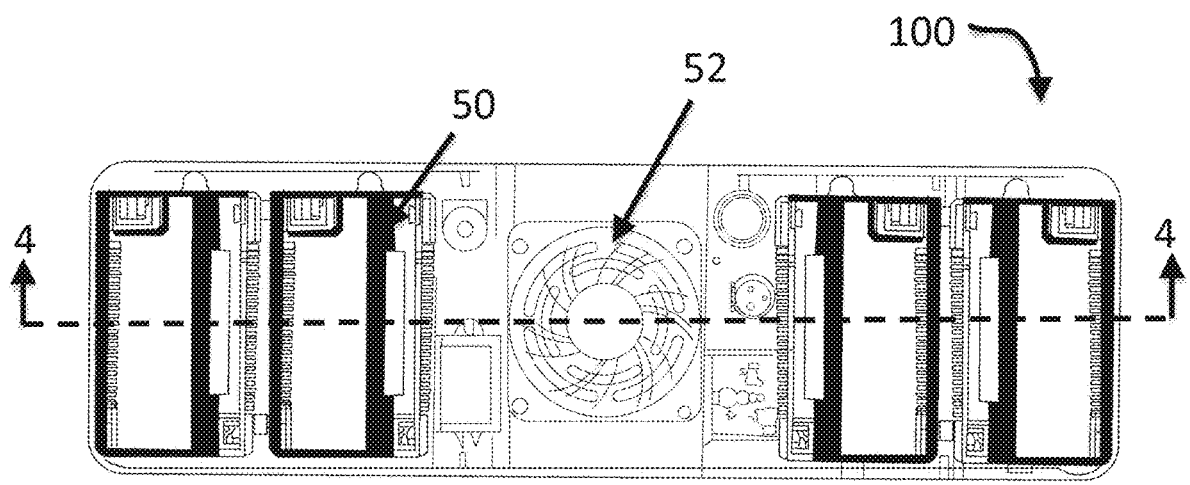
FIG. 4 shows a cross-sectional front view taken at plane 4-4 of the embodiment of the arc modular LED light fixture of FIG. 2.
Figure 5:
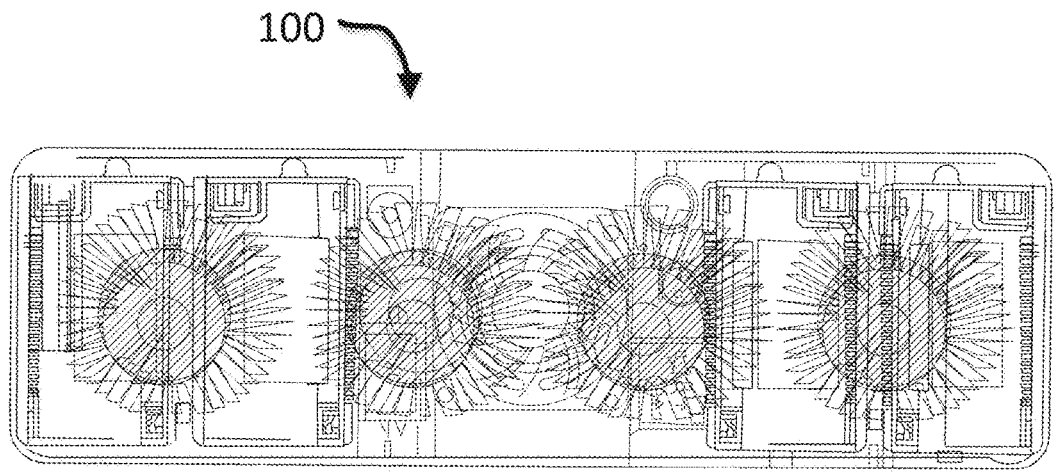
FIG. 5 shows a front wireframe view of an embodiment of an arc modular LED light fixture according to the present disclosure.

As shown in FIG. 3, each LED module 20 may include a heat sink 24 having an internal volume 40 defined by a closed end 42, a sidewall 43, and an open end 44. The heat sink 24 may further include a plurality of cooling fins 46 extending from the sidewall 43. In at least one embodiment, the internal volume 40 may be generally cylindrically shaped, and the cooling fins 46 may extend radially outward from the volume 40.

Each LED module 20 may further include an LED source 22 disposed within the internal volume 40 adjacent the closed end 42 of the heat sink 24. The LED source 22 may be a single light emitting diode or an array of multiple light emitting diodes depending upon the desired characteristics of the emitted light. As a non-limiting example, in at least one embodiment, the LED light source 22 may include at least three light-emitting diodes, at least one configured to emit red light at wavelengths between 610 and 760 nanometers (nm), at least one configured to emit orange light at wavelengths between 590 and 610 nm, and at least one configured to emit the blue light at wavelengths between 450 and 500 nm. In an alternative embodiment, the LED source 22 may include at least three light emitting diodes, at least one configured to emit red light at wavelengths between 610 and 760 nm, at least one configured to emit green light at wavelengths between 500 and 570 nm, and at least one configured to emit blue light at wavelengths between 450 and 500 nm. In yet another embodiment, the LED source 22 may include one light emitting diode configured to emit broad-spectrum white light.

The desired character of the light distribution produced by the fixture 100 may depend upon the intended use. For example, an aquarium flora grower may want a light distribution comprised mostly of broad-spectrum white light with some blue light and a very small amount of red light. Accordingly, different LED sources 22 may be selected for the LED modules 20 depending on the aesthetic or performance goals of the end user. Further, the power consumption of the LED source 22 may be selected to produce a predetermined intensity of emitted light.

The LED source 22 may be positioned such that light emitted therefrom is emitted toward the open end 44 of the heat sink 24 where it falls incident upon a lens 26 disposed adjacent the open end 44. In at least one embodiment, the lens 26 may be a collimating lens that narrows the distribution of light emitted by the LED source 22 to align the emitted light rays in a more specific direction. Thus, the lens 26 enables the LED module 20 to emit a concentrated distribution of light aimed or directed toward an area about a central point 30 of the radius of curvature of the front panel 12. In at least one embodiment, the lens 26 may be a positive or converging lens that focuses the distribution of light emitted by the LED source 22 to direct the emitted light rays to a specific point. Further, the lens 26 may be selected to provide a desired concentration of the emitted light. For example, the lens 26 may be a 90° lens, which will result in an illuminated area approximately 36 inches (in.) in diameter at a distance of 18 in. from the fixture 100. Alternatively, the lens 26 may be a 60°, 45°, 15°, or any desired concentration angle selected to produce the desired illuminated area at a desired distance. Thus, the lens 26 enables the LED module 20 to emit the desired concentrated distribution of light aimed or directed toward the central point 30 of the radius of curvature of the front panel 12.

The LED module 20 may further include a color-mixing lens 27 disposed between the LED source 22 and the lens 26 to enable the LED module 20 to emit a uniform desired color of light. The lens 26 may be removably attached to the heat sink 24 using a retainer 28, which enables the substitution of different lenses 26 within a given fixture 100. In some embodiments, the lens 26 may enable color mixing such that a separate lens 27 is not needed.

By disposing multiple LED modules 20 along the arc of the front panel 12, the fixture 100 may generate a concentrated field of light around the center point 30. In at least one embodiment of the present disclosure as shown in FIGS. 2-5, the fixture 100 may include four LED modules 20, each positioned along the arc of the front panel 12 and aimed at the same center point 30. For example, the fixture 100 may be configured to produce an illuminated area 36 in. in diameter at a distance of 18 in. from the fixture 100.

Figure 6:
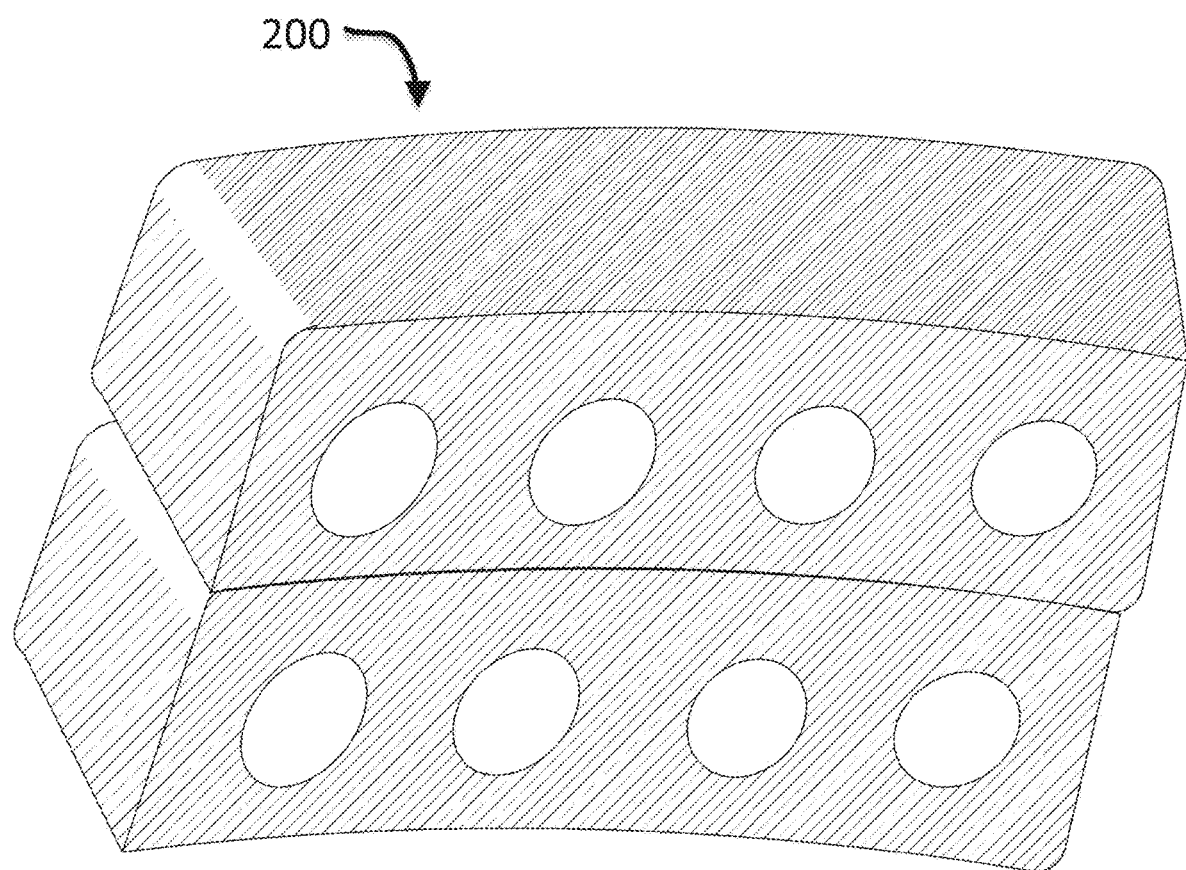
FIG. 6 shows an isometric view of an embodiment of an arc modular LED light fixture according to the present disclosure.
Figure 7:
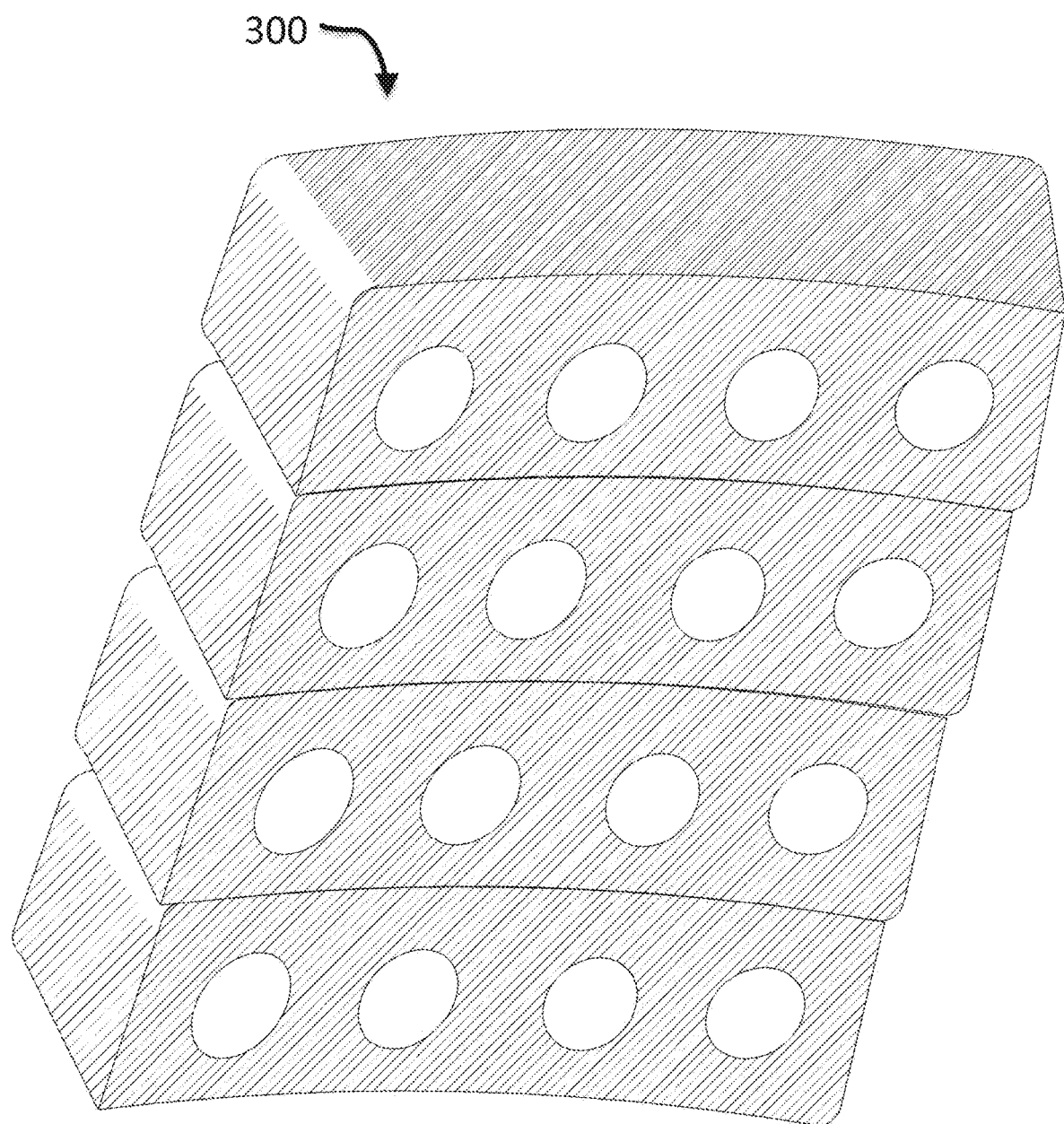
FIG. 7 shows an isometric view of an embodiment of an arc modular LED light fixture according to the present disclosure.

Multiple fixtures 100 may be combined to produce a wider and/or more intense illuminated area. As shown in FIG. 6, two fixtures 100 may be positioned adjacent one another to form the fixture 200, having two rows of LED modules 20 arranged along parallel arcs determined by the radius of curvature of the respective front panels 12 of the individual modular fixtures 100. In the fixture 200, the modular fixtures 100 may be arranged to converge their respective emitted light distribution patterns around the same center point 30, thereby generating a single, fully convergent distribution pattern of increased intensity. As shown in FIG. 7, multiple modular fixtures 100 may be positioned adjacent one another to form the fixture 300, having multiple rows of LED modules 20 arranged along parallel arcs to form an array of LED modules 20. Similar to the fixture 200, the modular fixtures 100 of the fixture 300 may be arranged to converge their respective emitted light distribution patterns around the same center point 30, thereby generating a single, fully convergent distribution pattern of increased intensity. Consequently, any number of modular fixtures 100 may be arranged to converge their respective emitted light distribution patterns around the same center point 30, thereby generating a single, fully convergent distribution pattern of increased intensity. Alternatively the modular fixtures 100 of the fixture 200 or the fixture 300 may be arranged to generate a wider resultant distribution pattern of substantially uniform intensity.

In the fixture 200 and the fixture 300, the modular fixtures 100 may be removably attached to one another by any suitable means. In at least one embodiment, the modular fixtures 100 may be attached to one another by magnets. Alternatively, the modular fixtures 100 may be attached to one another by fasteners, including but not limited to screws or clips. The means of attachment may further enable the modular fixtures 100 to be adjusted relative to one another such that the resultant distribution pattern may be adjusted. In at least one embodiment, the modular fixtures 100 may be attached to one another or removed from one another without having to open any part of the exterior body of the modular fixtures. In at least one embodiment, a dowel pin links the exterior body of a modular fixture with the exterior body of one or more other modular fixtures by weaving through a hole or plurality of holes through housing 10, enabling the modular fixtures to affix to each other.

The retainer 28 of the LED module 20 may be adjustable such that the angel of aim of an individual LED module 20 within the fixture 200 or the fixture 300 may be adjusted relative to the radius of curvature of the front panel 12 and to other LED modules 20 with the fixture 200, 300. Accordingly, the illuminated area produced by the fixture 200 or the fixture 300 may be adjusted—either narrowed or widened—as desired by adjusting the aim of individual LED modules 20 within a given fixture 200, 300. Alternatively, the means of attaching the modular fixtures 100 to one another within the fixture 200 or fixture 300 may be adjustable such that one fixture 100 may be aimed independent of an adjacent fixture 100, thereby either narrowing or widening the illuminated area produced by a given fixture 200, 300 as desired. The angle of aim of an individual LED module 20 may be adjusted by other adjusting means besides the retainer 28.

Referring now to FIG. 2, the fixture 100 may further include a cooling fan 52 and a fan driver disposed within the housing 10. In at least one embodiment, the cooling fan 52 is disposed adjacent the back panel 14 at or near a vent 18. The cooling fan 52 may increase the transfer of heat from the LED modules 20 by forcing ambient air across the heat sink 24, including cooling fins 44, by drawing ambient air into, through, and out of the housing 10 via the vents 18.

The fixture 100 may further include one or more controllers 50 disposed within the housing 10 to provide electrical power to the LED modules 20. In at least one embodiment, each controller 50 may be electrically connected to a corresponding LED module 20. Alternatively, one controller 50 may be electrically connected to a plurality or to all the LED modules 20 included in the fixture 100. The one or more controllers 50 may include control circuitry capable of power management functions for the LED modules 20, and, specifically, the LED source 22. The one or more controllers 50 may include constant current control circuitry that regulates the power provided to the LED source 22 at a prescribed current level, thereby protecting the LED source 22 from undesirable conditions, such as voltage spikes. The one or more controllers 50 may further include a power transformer to convert input alternating current to direct current suitable for the LED source 22. In at least one embodiment according to the present disclosure, the LED module 20 may include the controller 50, the cooling fan 52, the fan driver 54, and all necessary electrical connections. In such an embodiment, the housing 10 may include only the front panel 12, where the front panel 12 may include only a minimal structure necessary to support the plurality of LED modules 20. Such an embodiment may improve the transfer of heat from the heat sink 24 because the LED module 20 is not enclosed within side panels 16 and the back panel 14. In other embodiments, the housing 10 may fully enclose the LED module 20 in an airtight, watertight manner. The airtight, watertight enclosure in an embodiment is desirable especially in the specific context where watering of plants takes place in the vicinity of the embodiment of the invention.

Referring to FIG. 1, the fixture 100 may include a power connector 60 disposed through the housing 10 and electrically connected to the one or more controllers 50. The fixture 100 may include a power switch 62 disposed through the housing 10 and electrically connected between the power connector and the one or more controllers 50. The fixture 100 may further include a power interconnect 64 to enable a plurality of fixtures 100 to be electrically linked in parallel to form an array of fixtures 100, such as the fixture 200 and the fixture 300. The fixture 100 may include a dimmer 66 to enable adjustment of the electrical power supplied to the LED modules 20 and, thereby, adjust and vary the intensity of the light emitted by the fixture 100.

Figure 8A:
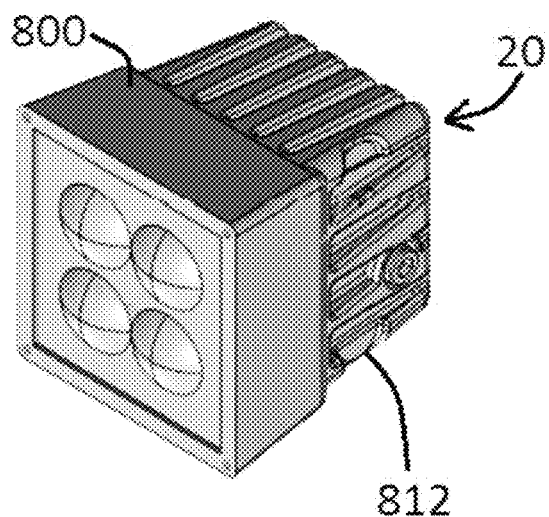
FIG. 8A shows a perspective view of an embodiment of an LED module, according to the present disclosure.
Figure 8B:
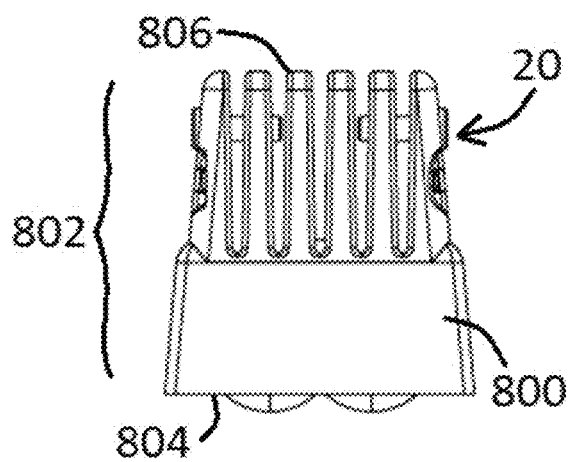
FIG. 8B shows a top view of an embodiment of an LED module, according to the present disclosure.
Figure 8C:
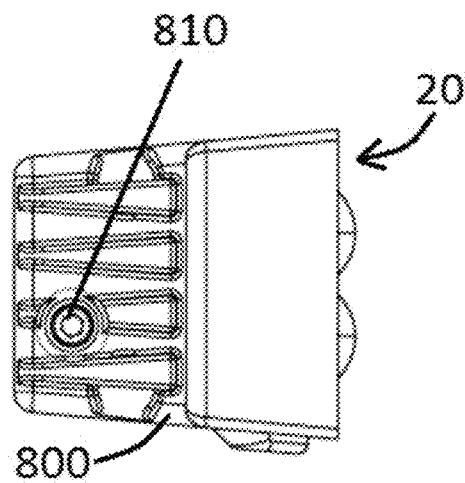
FIG. 8C shows a side view of an embodiment of an LED module, according to the present disclosure.
Figure 8D:
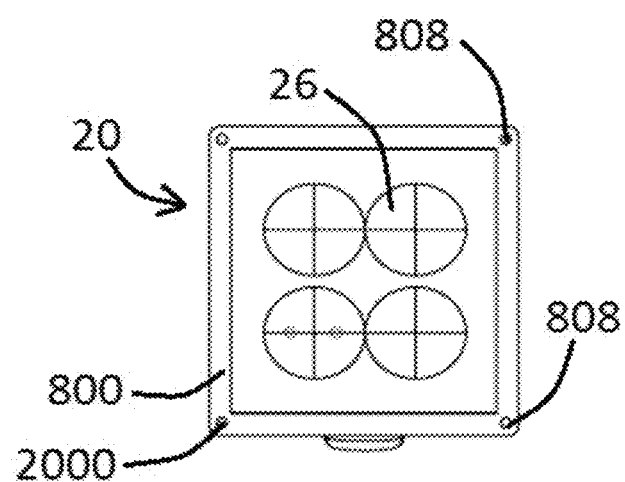
FIG. 8D shows a front view of an embodiment of an LED module, according to the present disclosure.
Figure 9A:
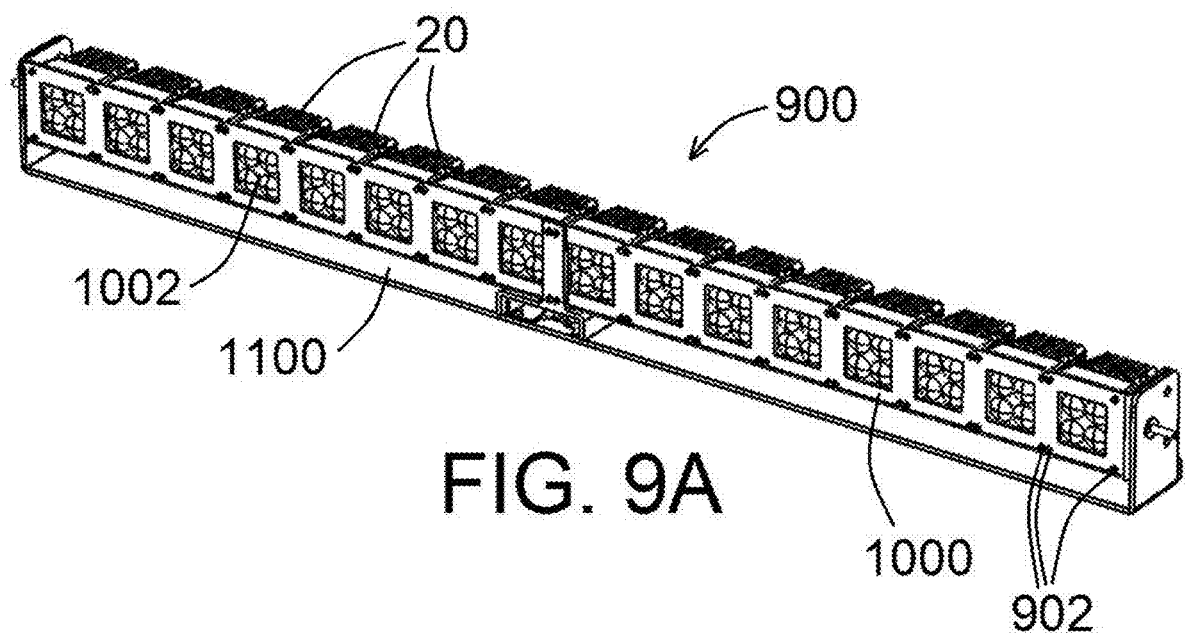
FIG. 9A shows a front perspective view of an embodiment of a module system, according to the present disclosure.

FIGS. 8A-8D show additional exemplary embodiments of LED modules 20 of the present disclosure. As shown therein, LED modules 20 can each comprise an outer housing 800 configured to be mounted to a flexible plate 1000 (as described in further detail herein). Housings 800 can comprise any number of overall shapes, such as a relatively square or cube shape, and as shown in FIGS. 8B and 8C, for example, defining a tapered portion 802 extending from a relative front 804 to a relative back 806 of said housing, as identified in FIG. 8B. One or more lenses 26, such as a plurality of lenses 26 shown in FIG. 8D, can be positioned at or near a relative front 804 of said module 20 so that LED sources 22 present therein (such as shown in FIG. 22) can emit light from LED module 20 and through lenses 26. Outer housings 800 may have one or more fastener apertures 808 or fastener holes 2000 defined therein, such as shown in FIG. 8D, configured to receive one or more fasteners 902, as shown in FIG. 9A, for example. Housings 800 can also define a screw hole 810, such as shown in FIG. 8C, so that a screw (an exemplary fastener 902) can be used to couple housing 800 to any desired substrate. A relief 812, such as shown in FIG. 8A, can offer clearance for end pins 1200 (discussed in further detail herein) when flexible plate 1000 flexes during operation of an exemplary module system 900 of the present disclosure.

Figure 9B:
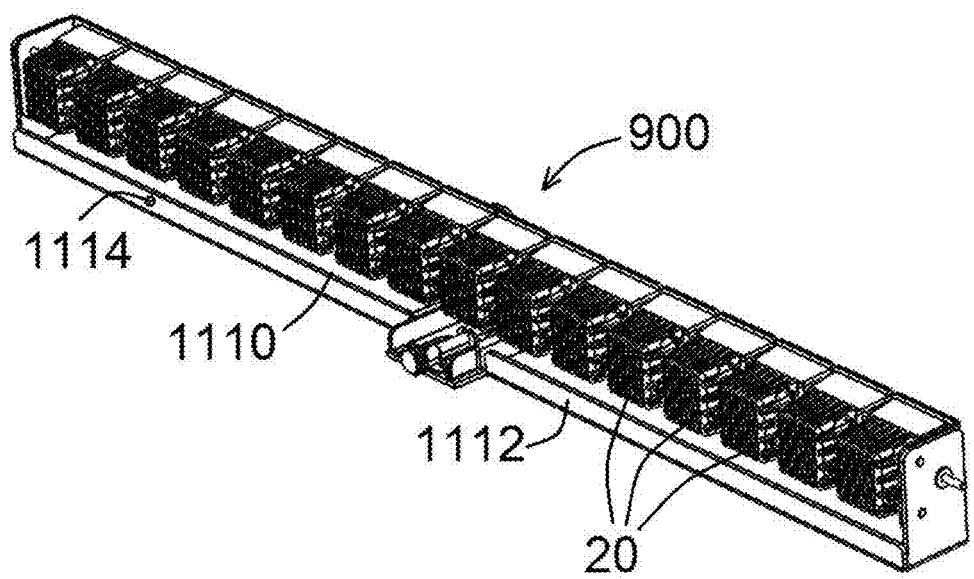
FIG. 9B shows a rear perspective view of an embodiment of a module system, according to the present disclosure.

FIGS. 9A and 9B show perspective views of exemplary module systems 900 of the present disclosure. Module systems 900, as shown therein, comprise a plurality of LED modules 20, such as shown in FIGS. 8A-8D for example, and other componentry configured to retain said LED modules. Cabling 1110 can be tracked along a rear lip 1112 of rigid beam 1100, such as shown in FIG. 9B, and/or apertures 1114 can be defined within rear lip 1112 of rigid beam 1100. FIG. 9A shows a front perspective view, and FIG. 9B shows a rear perspective view, of exemplary module systems 900 of the present disclosure.

FIGS. 10A-10D show an exemplary embodiment of a flexible plate 1000 of the present disclosure. Flexible plates 1000, as referenced herein, are configured to engage a plurality of LED modules 20, such as shown in FIG. 9A, whereby flexible plate(s) 1000 become part of exemplary module systems 900 of the present disclosure, as shown in FIG. 9A. Flexible plates 1000 of the present disclosure have lens apertures 1002 defined therein, such as shown in FIG. 10D, so that when a LED module 20 is coupled to flexible plate 1000, some or all of lens 26 can be seen from a relative front of flexible plate 1000 within a corresponding lens aperture 1002, so that light from LED module 20 can be directed from LED module 20, through lens 26, and through lens aperture 1002, such as shown in FIG. 9A. FIG. 10A shows a perspective view, FIG. 10B shows a top view, FIG. 10C shows a side view, and FIG. 10D shows a front view, of an exemplary flexible plate 1000 of the present disclosure.

Figure 20A:
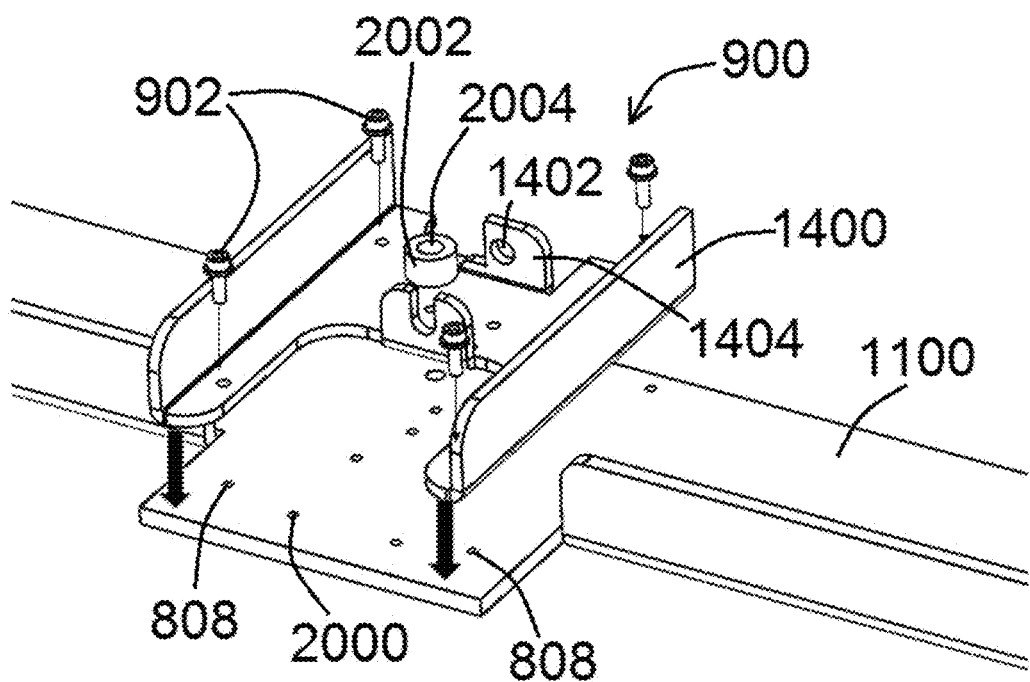
FIG. 20A shows a perspective view of a portion of a rigid beam in the process of having a mechanism cradle 1400 fastened thereto, according to the present disclosure.

Flexible plates 1000 of the present disclosure may further define fastener apertures 808 therein, as shown in FIG. 10D. Fasteners 902, as shown in FIGS. 9A and 20A, for example, can then be used to secure LED modules 20 to flexible plates 1000 by way of positioning at least part of a fastener 902 through a fastener aperture 808 of a flexible plate 1000 and also through a fastener aperture 808 of a housing 800.

A stiffener rail 1010, such as shown in FIG. 10A, may also be used to provide some rigidity to an otherwise flexible/compliant flexible plate 1000. Stiffener rail 1010, when used, would be coupled to portions of flexible plate 1000 as desired.

Figure 11A:
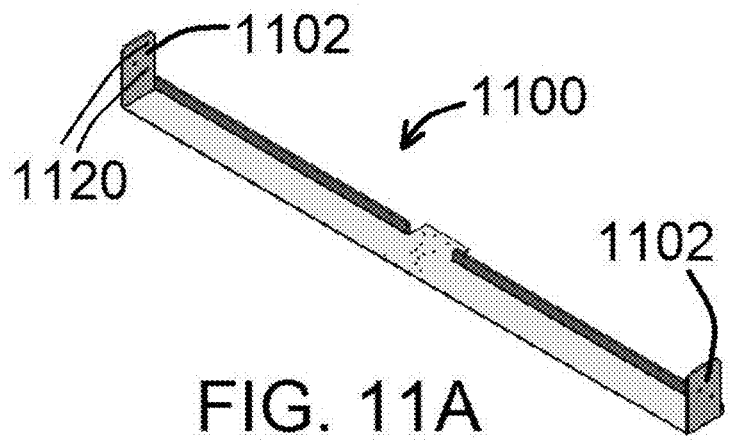
FIG. 11A shows a perspective view of an embodiment of a rigid beam, according to the present disclosure.
Figure 11C:
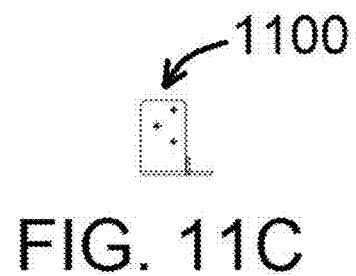
FIG. 11C shows a side view of an embodiment of a rigid beam, according to the present disclosure.
Figure 11B:
FIG. 11B shows a front view of an embodiment of a rigid beam, according to the present disclosure.
Figure 11D:
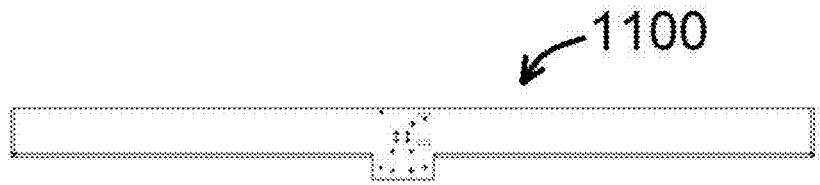
FIG. 11D shows a top view of an embodiment of a rigid beam, according to the present disclosure.
Figure 11E:
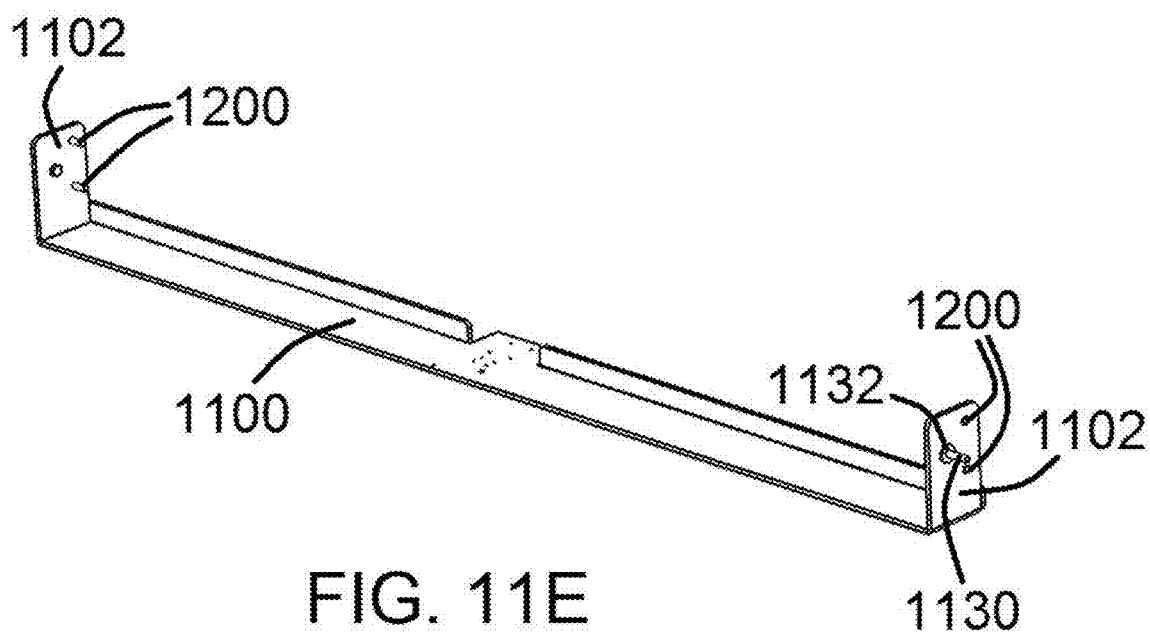
FIG. 11E shows a perspective view of an embodiment of a rigid beam having end pins welded thereto, according to the present disclosure.

FIGS. 11A-11E show exemplary embodiments of a rigid beam 1100 of the present disclosure. Rigid beams 1100, as referenced herein, are configured to engage flexible plates 1000, whereby rigid beams 1100 also become part of exemplary module systems 900 of the present disclosure, as shown in FIG. 9A. Rigid beams 1100 are configured to be coupled to flexible plates 1000, allowing flexible plates 1000 to flex as desired, while allowing module system 900 to remain coupled to a desired substrate, such as a vehicle, building, or other substrate. Weld points 1120 are shown in FIG. 11A on end plates 1102 of rigid beam 1100, which can be used to identify locations where end pins 1200 (described below) can ultimately be welded to said end plates 1102. Attachment screws 1130 and washers 1132 can be attached to end plates 1102 as well, such as shown in FIG. 11E, so to facilitate mounting of rigid plate 1100 to a desired substrate, such as a vehicle, for example. FIG. 11A shows a perspective view, FIG. 11B shows a front view, FIG. 11C shows a side view, and FIG. 11D shows a top view, of an exemplary rigid beam 1100 of the present disclosure. FIG. 11E also shows a perspective view of an exemplary rigid beam 1100 of the present disclosure, but with end pins 1200 welded thereto, as noted below. Rigid beams 1100 of the present disclosure may be formed from sheet metal, or comprise another suitable material, such as plastic or wood.

Figure 12A:
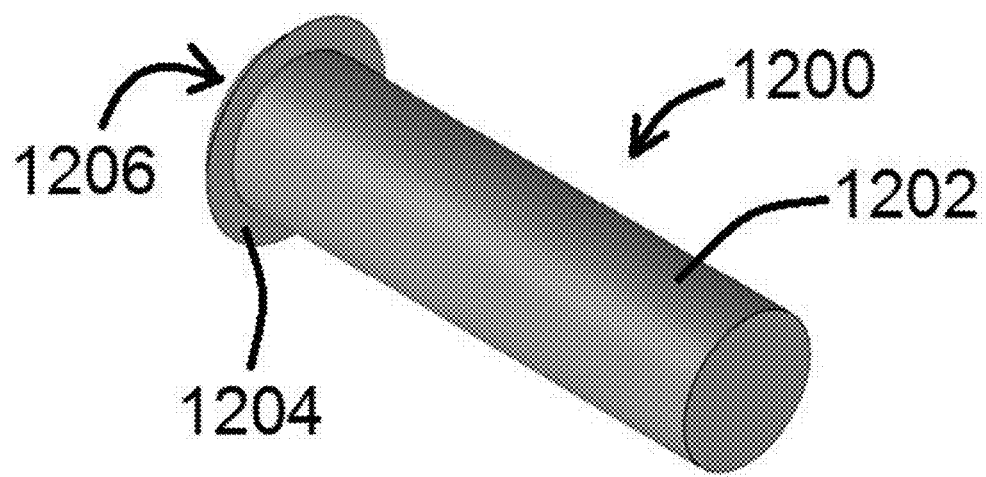
FIG. 12A shows a perspective view of an embodiment of an end pin, according to the present disclosure.
Figure 12B:
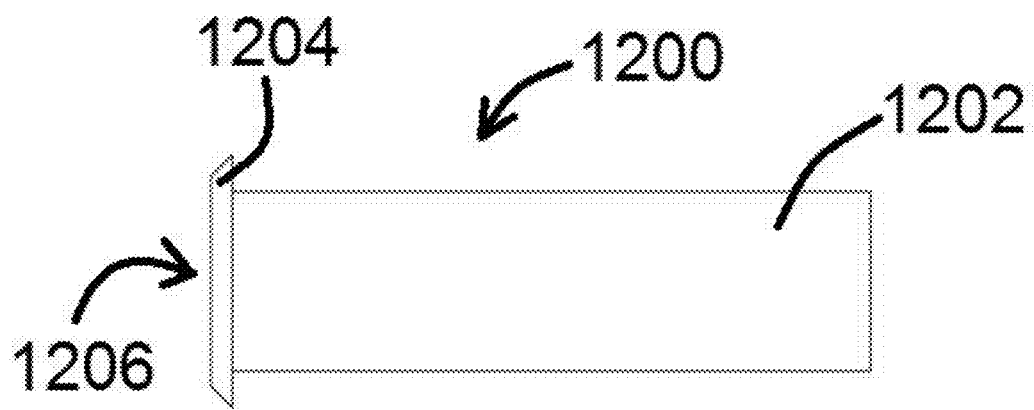
FIG. 12B shows a side view of an embodiment of an end pin, according to the present disclosure.

Rigid beams 1100 can be coupled to flexible plates 1000 of the present disclosure using, for example, one or more end pins 1200, as shown in FIGS. 12A and 12B. End pins 1200, as shown in FIGS. 12A and 12B, can comprise an elongated cylindrical portion 1202 and a flange portion 1204 at a relative end 1206 of pin 1200, whereby flange portion 1204, for example, may have a larger diameter or cross-sectional area than part of cylindrical portion 1202. End pins 1200 can be welded to, for example, end plates 1102 of rigid beams 1100, such as whereby end plates 1102 are positioned at relative ends of rigid beams 1100 as shown in FIG. 11A.

Figure 13A:
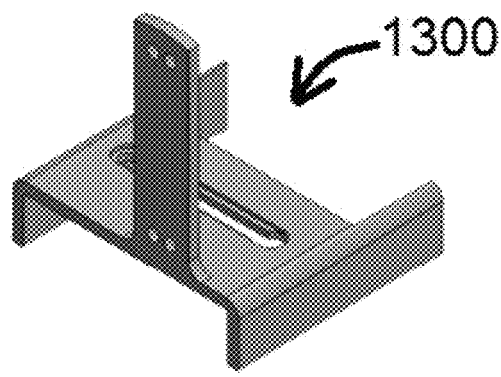
FIG. 13A shows a perspective view of an embodiment of a pusher, according to the present disclosure.
Figure 13B:
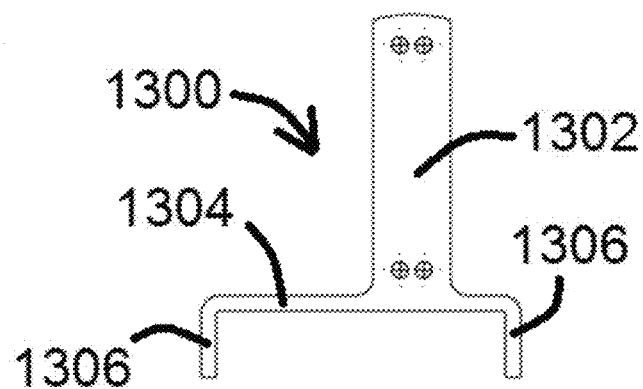
FIG. 13B shows a front view of an embodiment of a pusher, according to the present disclosure.
Figure 13C:
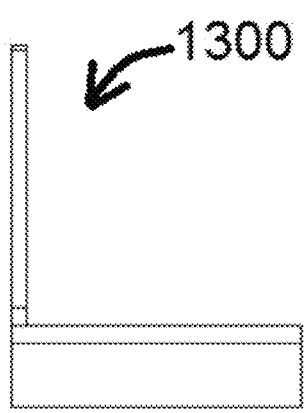
FIG. 13C shows a side view of an embodiment of a pusher, according to the present disclosure.
Figure 13D:
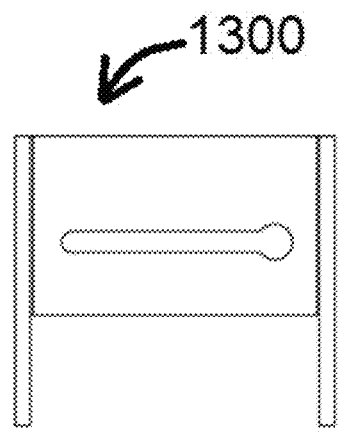
FIG. 13D shows a bottom view of an embodiment of a pusher, according to the present disclosure.

FIGS. 13A-13D show an exemplary embodiment of a pusher 1300 of the present disclosure. Pushers 1300, as referenced herein, are configured to push against portions of module systems 900, such as flexible plates 1000, so that flexible plate 1000 can flex inward (so to create a concave flexible plate 1000) or outward (so to create a convex flexible plate 1000), as may be desired, so that LED modules 20 of module systems 900 direct light in desired directions. Exemplary pushers 1300 of the present disclosure can comprise a vertical or relatively vertical pusher bar extending from a horizontal or relative horizontal pusher base 1304, whereby pusher rails 1306 extend downward (vertically or relatively vertically) from pusher base 1304, as shown in FIG. 13B. FIG. 13A shows a perspective view, FIG. 13B shows a front view, FIG. 13C shows a side view, and FIG. 13D shows a bottom view of an exemplary pusher 1300 of the present disclosure.

Figure 14A:
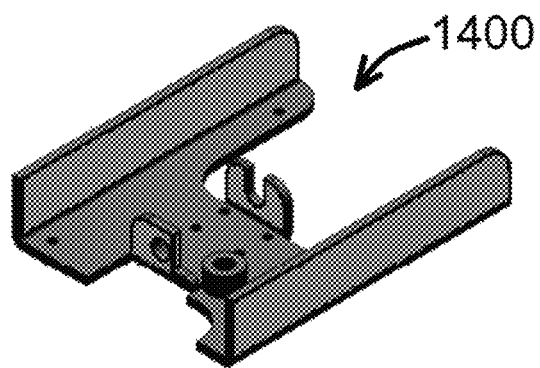
FIG. 14A shows a perspective view of an embodiment of a mechanism cradle, according to the present disclosure.
Figure 14B:
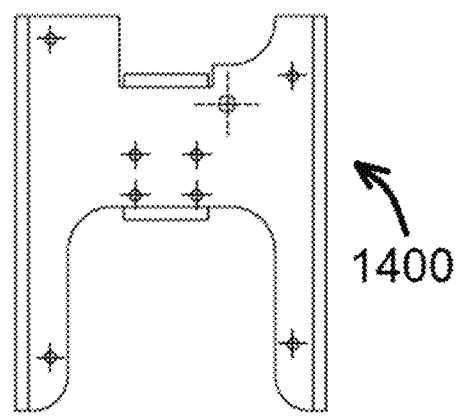
FIG. 14B shows a bottom view of an embodiment of a mechanism cradle, according to the present disclosure.
Figure 14C:
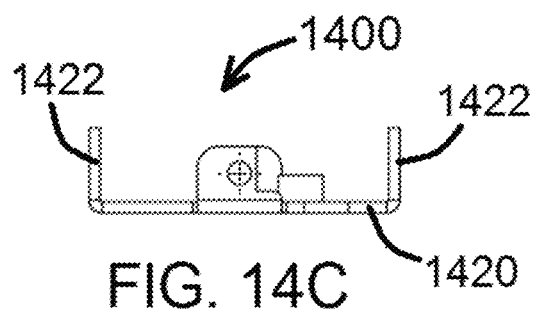
FIG. 14C shows a front view of an embodiment of a mechanism cradle, according to the present disclosure.
Figure 14D:
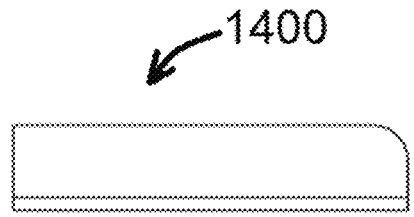
FIG. 14D shows a side view of an embodiment of a mechanism cradle, according to the present disclosure.

FIGS. 14A-14D show an exemplary embodiment of a mechanism cradle 1400 of the present disclosure. Mechanism cradles 1400, as referenced herein, are configured to couple to a rigid beam 1100, as shown in FIG. 20A, and ultimately receive a pusher 1300, as shown in FIG. 13A, so that pusher 1300 can operate to change the configuration/flexation of flexible plate 100. Exemplary mechanism cradles 1400 of the present disclosure can have a flat (horizontal or relatively horizontal) cradle base 1420 having cradle rails 1422 extending therefrom in a vertical or relatively vertical direction, such as shown in FIG. 14C. FIG. 14A shows a perspective view, FIG. 14B shows a bottom view, FIG. 14C shows a front view, and FIG. 14D shows a side view of an exemplary mechanism cradle 1400 of the present disclosure.

Figure 15A:
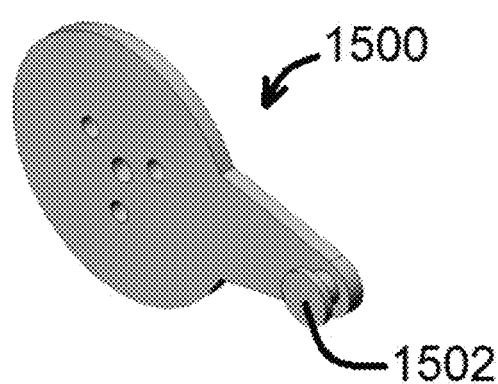
FIG. 15A shows a perspective view of a rotary push plate, according to the present disclosure.
Figure 15B:
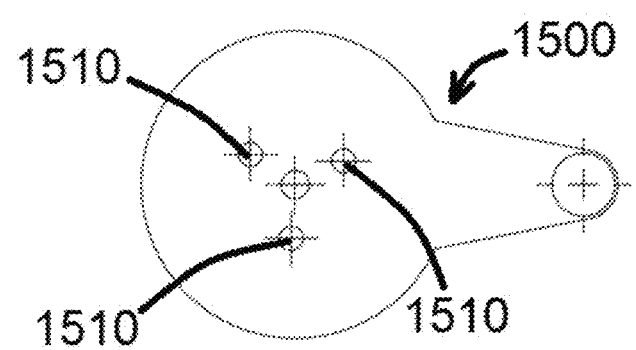
FIG. 15B shows a pack view of a rotary push plate, according to the present disclosure.
Figure 15C:
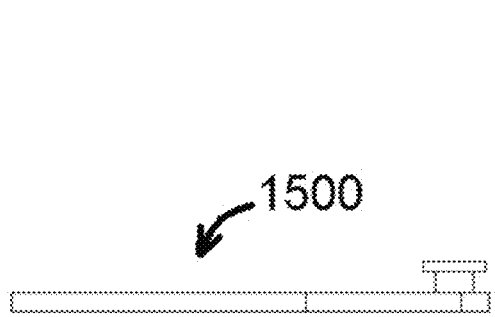
FIG. 15C shows a horizontal side view of a rotary push plate.
Figure 15D:
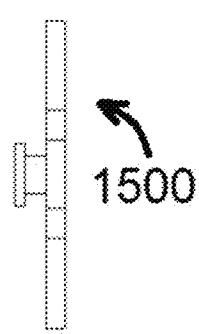
FIG. 15D shows a vertical side view of a rotary push plate, according to the present disclosure.
Figure 16A:
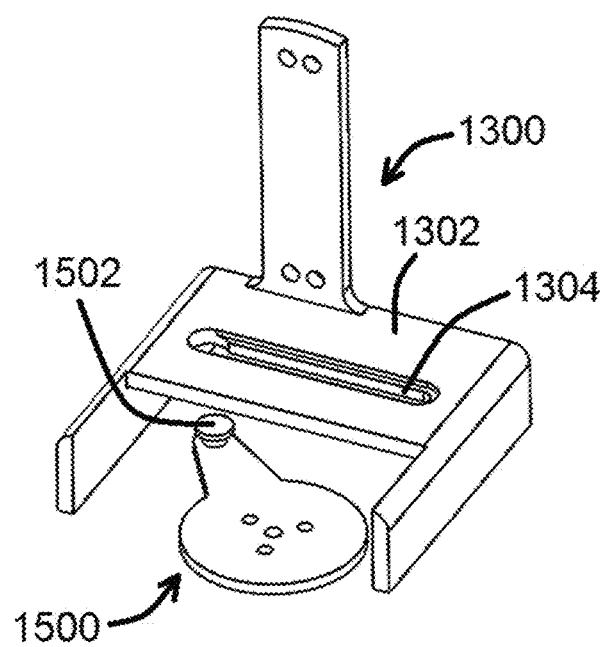
FIGS. 16A and 16B show perspective views of pushers, according to the present disclosure.
Figure 16B:
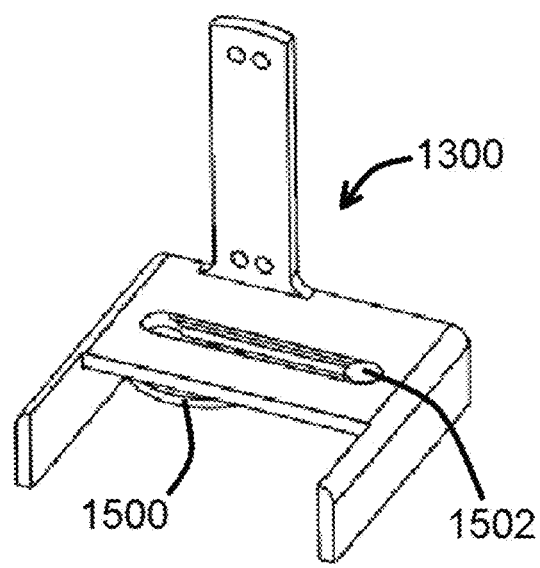

FIGS. 15A-15D show an exemplary embodiment of a rotary push plate 1500 of the present disclosure. Rotary push plates 1500, as referenced herein, are configured to engage a pusher 1300, such as shown in FIGS. 16A and 16B, to facilitate operation of pusher 1300 along with other components of module systems 900, as referenced herein. As shown in FIG. 16A, a flanged pin 1502 of rotary push plate 1500 is configured to be positioned within an elongate groove 1302 defined within a horizontal plate 1304 of pusher 1300. When pusher 1300 and rotary push plate 1500 are coupled together, as referenced above and as shown in FIG. 16B and formed as part of module system 900, rotary movement of rotary push plate 1500 causes pusher 1300 to move, causing flexible plate 100 to move as referenced herein. FIG. 15A shows a perspective view, FIG. 15B shows a pack view, FIG. 15C shows a horizontal side view, and FIG. 15D shows a vertical side view of an exemplary rotary push plate 1500 of the present disclosure. FIGS. 16A and 16B show perspective views of pushers 1300, with a rotary push plate 1500 not coupled to pusher 1300 in FIG. 16A and coupled to pusher 1300 in FIG. 16B.

Figure 17A:
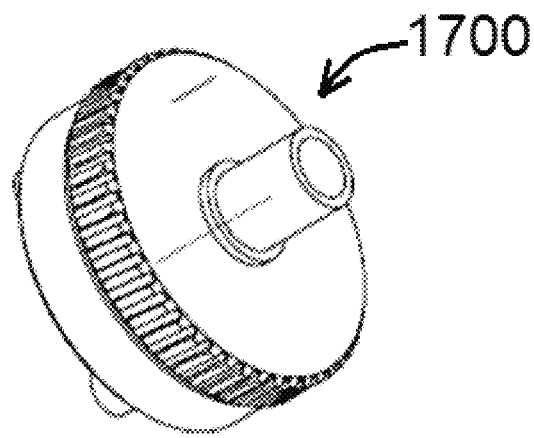
FIG. 17A shows a perspective view of a gear assembly, according to the present disclosure.
Figure 17B:
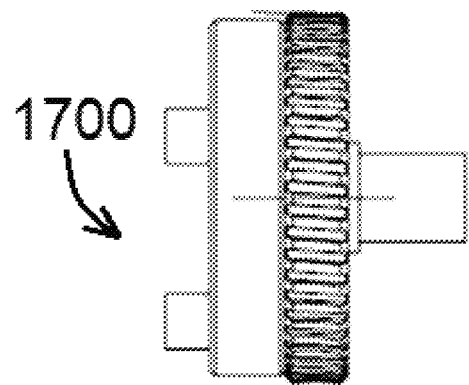
FIG. 17B shows a side view of a gear assembly, according to the present disclosure.
Figure 17C:
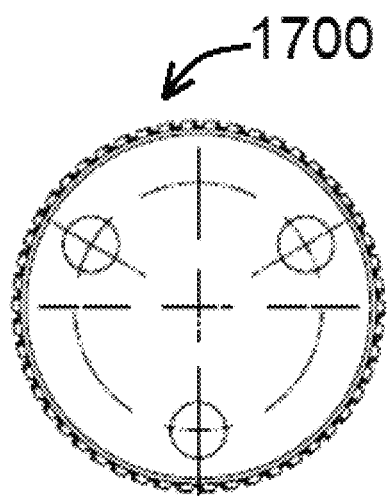
FIG. 17C shows a top view of a gear assembly, according to the present disclosure.
Figure 17D:
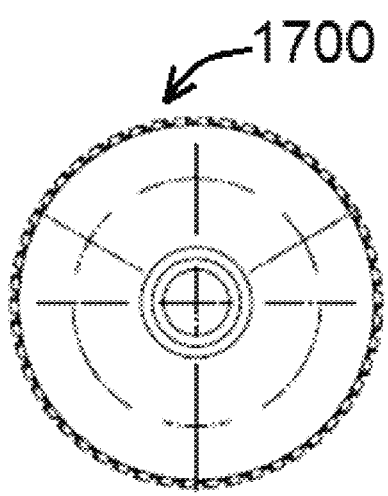
FIG. 17D shows a bottom view of a gear assembly, according to the present disclosure.

FIGS. 17A-17D show an exemplary embodiment of a gear assembly 1700 of the present disclosure. Gear assemblies 1700, as referenced herein, are configured to engage a worm shaft 1800 (as shown in FIG. 18A) so to facilitate movement of pusher 1300, as described herein. Gear assemblies 1700, as shown in FIGS. 17A-17D, can comprise various elements, such as shown in FIG. 21C and described in further detail herein. FIG. 17A shows a perspective view, FIG. 17B shows a side view, FIG. 17C shows a top view, and FIG. 17D shows a bottom view of an exemplary gear assembly 1700 of the present disclosure.

FIGS. 18A-18D show an exemplary embodiment of a worm shaft 1800 of the present disclosure. Worm shafts 1800, as referenced herein, are configured to engage gear assemblies 1700 so that rotation of worm shafts 1800 cause rotation of gear assemblies 1700, as described herein. FIG. 18A shows a perspective view, FIG. 18B shows a front view, and FIGS. 18C and 18D show side views of an exemplary worm shaft 1800 of the present disclosure.

Figure 19A:
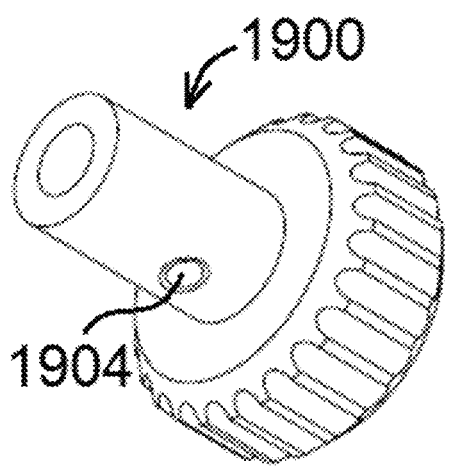
FIG. 19A shows a perspective view of an adjustment knob, according to the present disclosure.
Figure 19B:
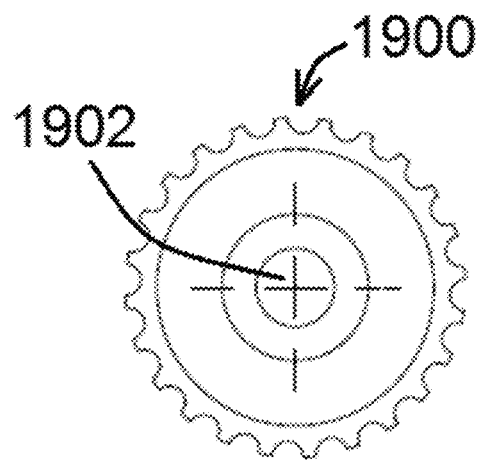
FIG. 19B shows a front view of an adjustment knob, according to the present disclosure.
Figure 19C:
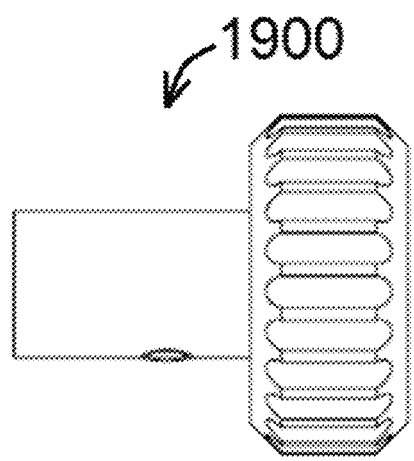
FIG. 19C shows a side view of an adjustment knob, according to the present disclosure.

FIGS. 19A-19C show an exemplary embodiment of an adjustment knob 1900 of the present disclosure. Adjustment knobs 1900, as referenced herein, are configured to couple to worm shafts 1800, as described herein, so that turning adjustment knob 1900 causes worm shaft 1800 to rotate, causing gear assembly 1700 to rotate, and ultimately causing pusher 1300 to move to cause flexible plate 1000 to move. FIG. 19A shows a perspective view, FIG. 19B shows a front view, and FIG. 19C shows a side view of an exemplary adjustment knob 1900 of the present disclosure.

FIG. 20A shows an exemplary embodiment of a portion of a rigid beam 1100 (a portion of a module system 900 of the present disclosure) in the process of having an exemplary mechanism cradle 1400 fastened thereto. One or more fasteners 902 can be used to secure mechanism cradle 1400 to rigid beam 1100, and/or another mechanism of fastening can be used, such as by way of welding, an adhesive, a clip, and the like. In at least one embodiment, fasteners 902 comprise M3 screws. Fasteners 902 would be at least partially inserted into fastener apertures 808 defined within mechanism cradle 1400 and rigid beam 1100 (such as in the direction of the downward pointing arrows in the figure), noting that should a fastener aperture 808 not be defined within rigid beam 1100 (such as when the hole is not defined all the way through rigid beam 1100), a fastener hole 2000 can be defined at least partially within rigid beam 1100 so to receive at least part of fastener 808. A boss 2002, such as shown in FIG. 20A, having a clearance hole 2004 defined therethrough, can be welded or otherwise attached to mechanism cradle 1400 so to ultimately receive at least part of gear assembly 1700, as referenced in further detail herein.

Figure 20B:
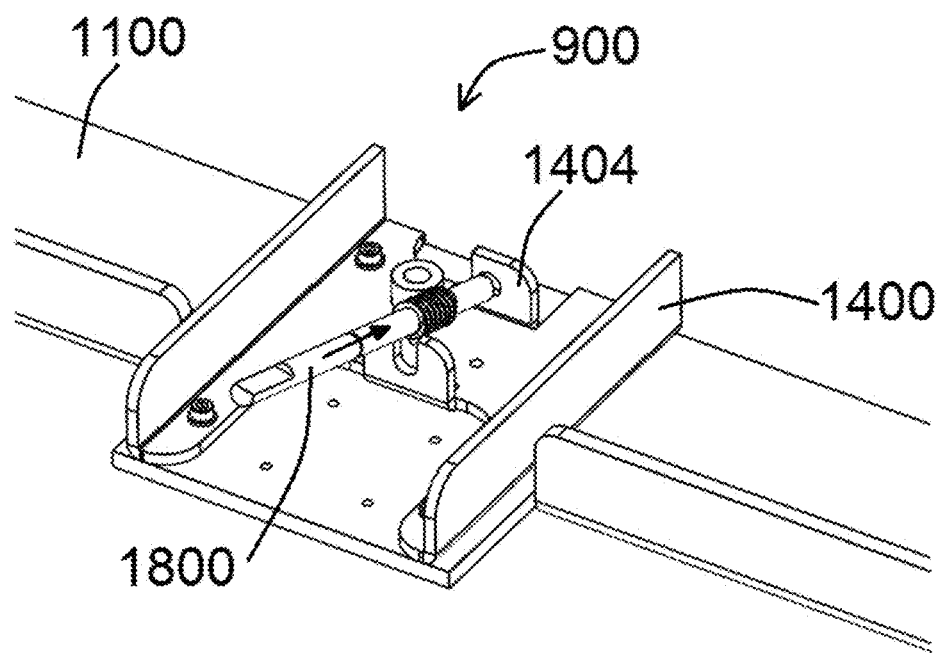
FIG. 20B shows a perspective view of portions of a module system whereby mechanism cradle is fastened to rigid beam, according to the present disclosure.

FIG. 20B shows portions of a module system 900 whereby mechanism cradle 1400 is fastened to rigid beam 1100, such as by way of using fasteners 902 as referenced in FIG. 20A. As shown in FIG. 20B, a worm shaft 1800 is being installed into module system 900 in the direction of the arrow following an elongated axis of worm shaft 1800 shown therein), whereby a distal portion 1802 of worm shaft 1800 is inserted into an aperture 1402, as shown in FIG. 20A, defined within a first vertical element 1404 of mechanism cradle 1400, as shown in FIGS. 20A and 20B.

FIG. 21A shows a gear assembly 1700 of the present disclosure being installed into module system 900. As shown therein, gear assembly 1700 is installed into module system 900 such that a central projection 1702 extending from gear assembly 1700 fits within a clearance hole 2004 of boss 2002 to allow gear assembly 1700 to rotate as desired. Once installed, such as shown in FIG. 21B, teeth 1704 positioned around gear assembly 1700 can engage spiral grooves 1804 of worm shaft 1800, such that rotation of worm shaft 1800 and rotation of gear assembly 1700 occur at the same time.

FIG. 21C shows portions of an exemplary gear assembly 1700 of the present disclosure, whereby gear assembly 1700 can comprise an upper portion 1750 and a lower portion 1752. Lower portion 1752 of gear assembly 1700, in at least one embodiment, can comprise the central projection 1702 extending from a first cylindrical element 1710, whereby teeth 1704 are defined around a circumference of first cylindrical element 1710. Upper portion 1750 of gear assembly 1700, in at least one embodiment, can comprise a second cylindrical element 1760, having gear protrusions 1700 extending therefrom, as shown in FIG. 21C.

Figure 22A:
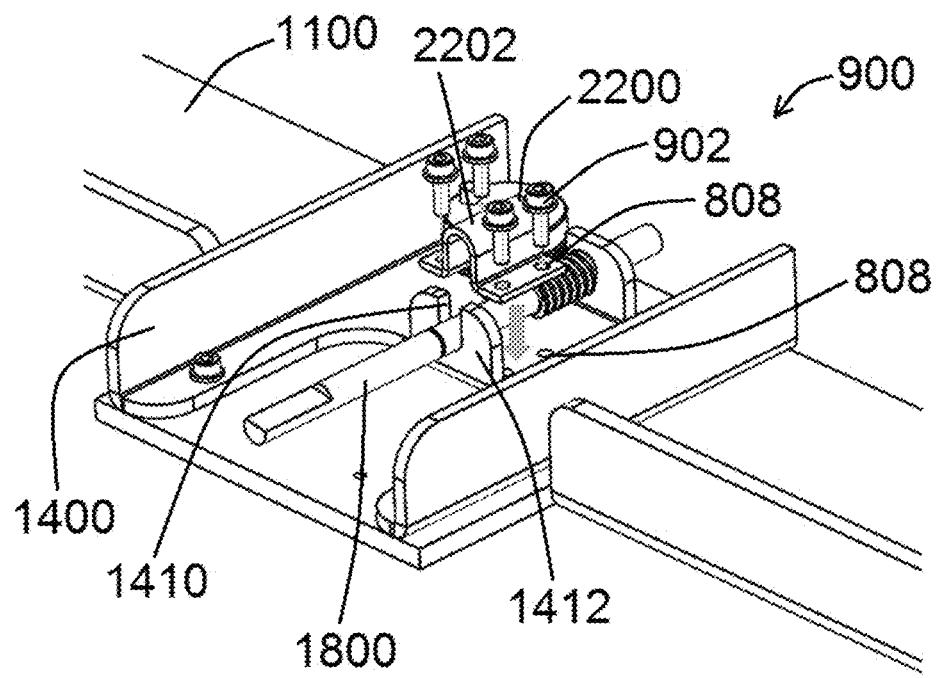
FIG. 22A shows a worm shaft retainer being installed into a module system, according to the present disclosure.

FIG. 22A shows portions of an exemplary module system 900 of the present disclosure having a worm shaft retainer 2200 in the process of being fastened thereto. As shown therein, worm gear retainer comprises an arched plate 2202 having fastener apertures 808 defined therein, whereby fasteners 902 can be positioned at least partially within fastener apertures 808 of arched plate 2202 and into fastener apertures 808 and/or fastener holes 2000 defined within mechanism cradle 1400, as referenced herein. Once worm shaft retainer 2200 is fastened or otherwise coupled to mechanism cradle, worm shaft 1800 is prevented from disengaging mechanism cradle 1400. As shown in FIG. 22A, a portion of worm shaft 1800 are positioned within first vertical element 1402 of mechanism cradle 1400, and another portion of worm shaft 1800 is positioned within a groove 1410 defined within a second vertical element 1412 of mechanism cradle 1400, so that worm shaft 1800 can readily rotate about/within aperture 1402 and groove 1410.

Figure 22B:
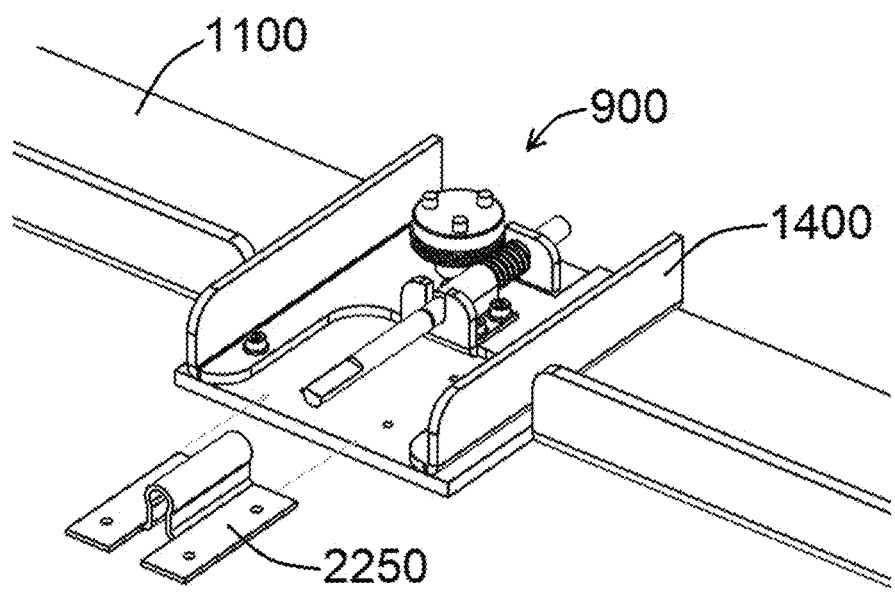
FIG. 22B shows an adjuster support and portions of a module system shown in a perspective view, according to the present disclosure.

FIG. 22B shows portions of an exemplary module system 900 of the present disclosure having a worm shaft retainer 2200 fastened thereto. An adjuster support 2250 is also shown in FIG. 22B, whereby adjuster support 2250 is also configured to be fastened to mechanism cradle 1400 so to maintain a proper position of worm shaft 1800.

Figure 23A:
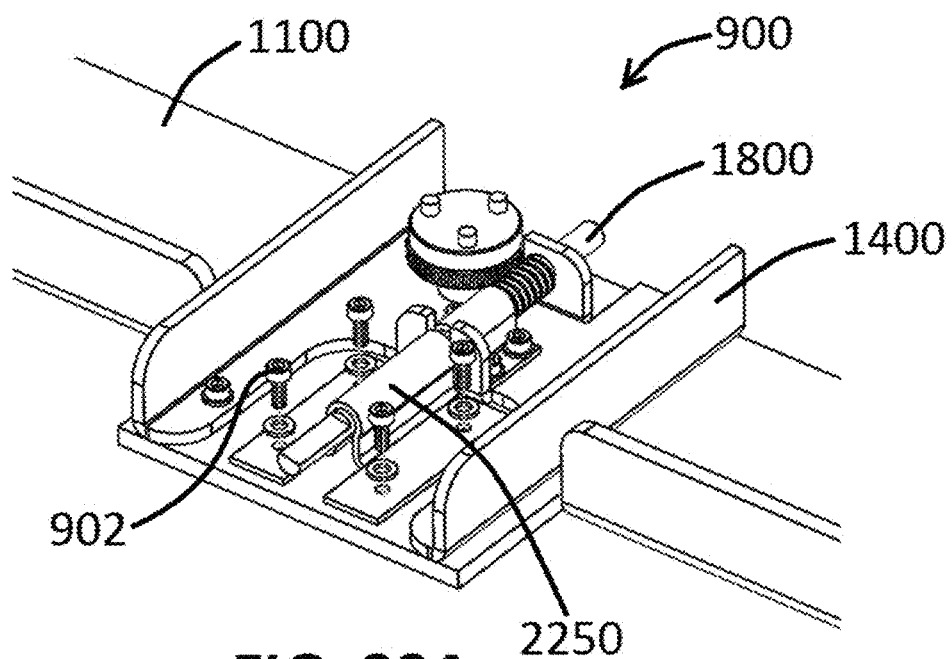
FIG. 23A shows an adjuster support being installed into a module system, according to the present disclosure.

FIG. 23A shows portions of an exemplary module system 900 of the present disclosure, whereby adjuster support 2250 is fastened to mechanism cradle 1400, such as by use of one or more fasteners 902 positioned within fastener apertures 808 defined within adjuster support 2250 and into fastener apertures 808 or fastener holes 2000 defined within mechanism cradle 1400.

Figure 23B:
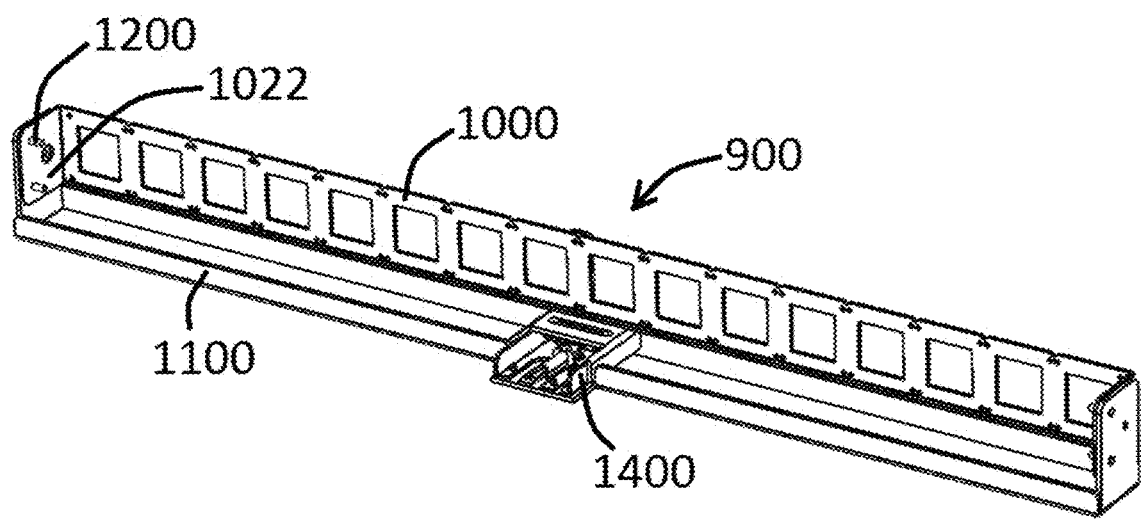
FIG. 23B shows a flexible plate connected to a rigid beam, according to the present disclosure.

FIG. 23B shows portions of an exemplary module system 900 of the present disclosure, whereby an exemplary flexible plate 1000 is shown coupled to an exemplary rigid beam 1100 of the present disclosure. As shown therein, end pins 1200 of rigid beam 1100, such as shown in FIG. 11E for example, are positioned within pin apertures 1020 defined within anchoring tabs 1022 extending from front portion 1024 of flexible plate 1000, such as shown in FIG. 10A. So to fit flexible plate 1000 onto rigid beam 1100 to fit about end pins 1200, flexible plate 1000 must flex/bend during placement. Mechanism cradle 1400, having various components coupled thereto and/or positioned thereon as shown in FIG. 23A, properly fits within module system 900 when flexible plate 1000 is coupled to rigid beam 1100 having mechanism cradle 1400 coupled thereto.

Figure 24A:
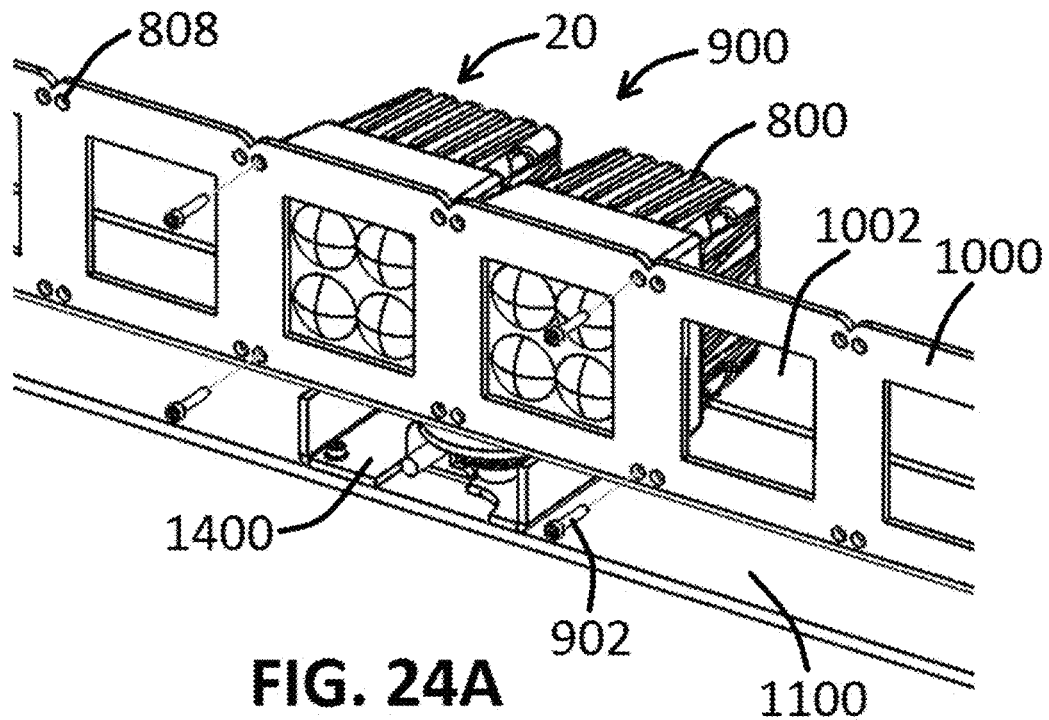
FIG. 24A shows LED modules being coupled to a flexible plate, according to the present disclosure.

Housings 800 of LED modules 20 can be coupled to flexible plate 1000 by way of fasteners 902 positioned through fastener apertures 808 or fastener holes 2000 defined within housings 800, as shown in FIG. 24A. Once fastened to flexible plate 1000, some or all of lens 26 would be visible through lens aperture 1002 of flexible plate 1000.

Figure 24B:
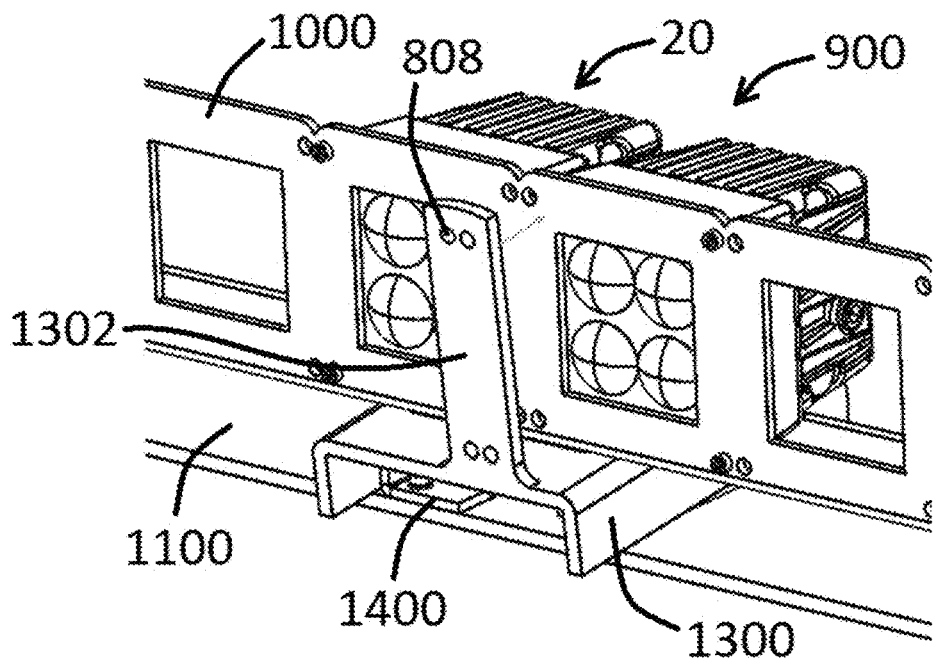
FIG. 24B shows a pusher being installed as part of a module system, according to the present disclosure.

A mechanism cradle 1300 can be positioned relative to mechanism cradle 1400, such as shown in FIG. 24B, so that pusher bar 1302 of pusher 1300 can ultimately be coupled to flexible plate 1000. LED modules 20 can be coupled to flexible plate 1000 before or after flexible plate 1000 is coupled to rigid beam 1100, such as shown in FIG. 24A. To fasten an exemplary pusher 1300 of the present disclosure to flexible plate 1000, for example, fasteners 902 can be positioned within fastener apertures 808 defined within pusher 1300 and flexible plate 1000 and further positioned into fastener apertures 808 or fastener holes 2000 defined within housing 800, such as shown in FIG. 25B. Pusher 1300, as shown in FIG. 24B, can be inserted so to slide along portions of mechanism cradle 1400. In various embodiments, pusher rails 1306, as shown in FIG. 13B, can be positioned next to cradle rails 1422, as shown in FIG. 14C, so that pusher 1300 cannot move side to side relative to cradle 1400 when positioned relative thereto and fastened to flexible plate 1000.

Figure 25A:
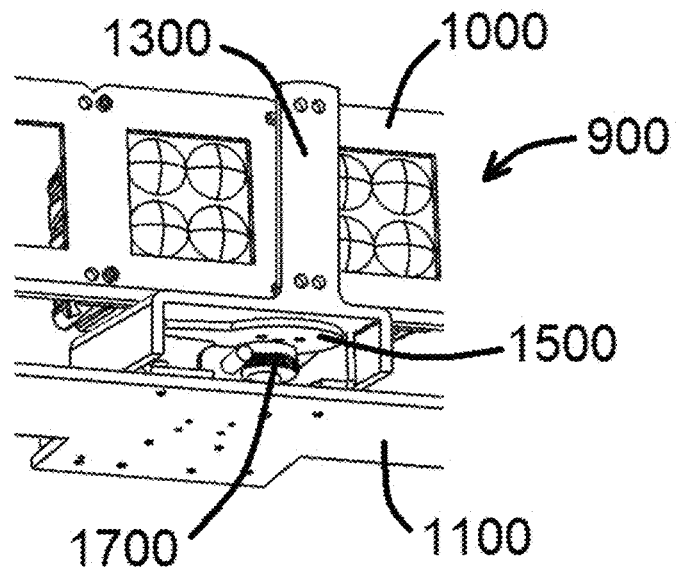
FIGS. 25A and 25B show pushers installed as parts of module systems, according to the present disclosure.
Figure 25B:
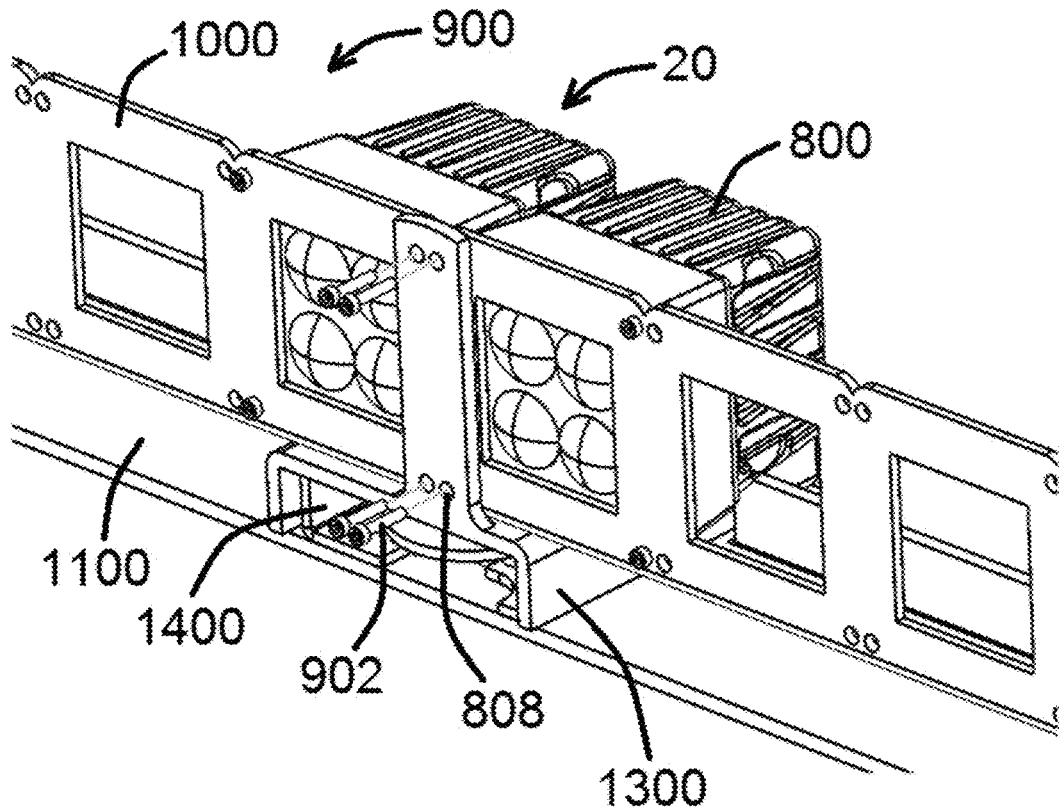

FIG. 25A shows a front perspective view of a portion of a module system 900 of the present disclosure. As shown therein, a rotary push plate 1500 is depicted, whereby proper positioning of rotary push plate 1500 relative to gear assembly 1700 would allow gear protrusions 1770 of gear assembly 1700, as shown in FIG. 21C, to fit within protrusion apertures 1510 defined within rotary push plate 1500, as shown in FIG. 15B.

Figure 26A:
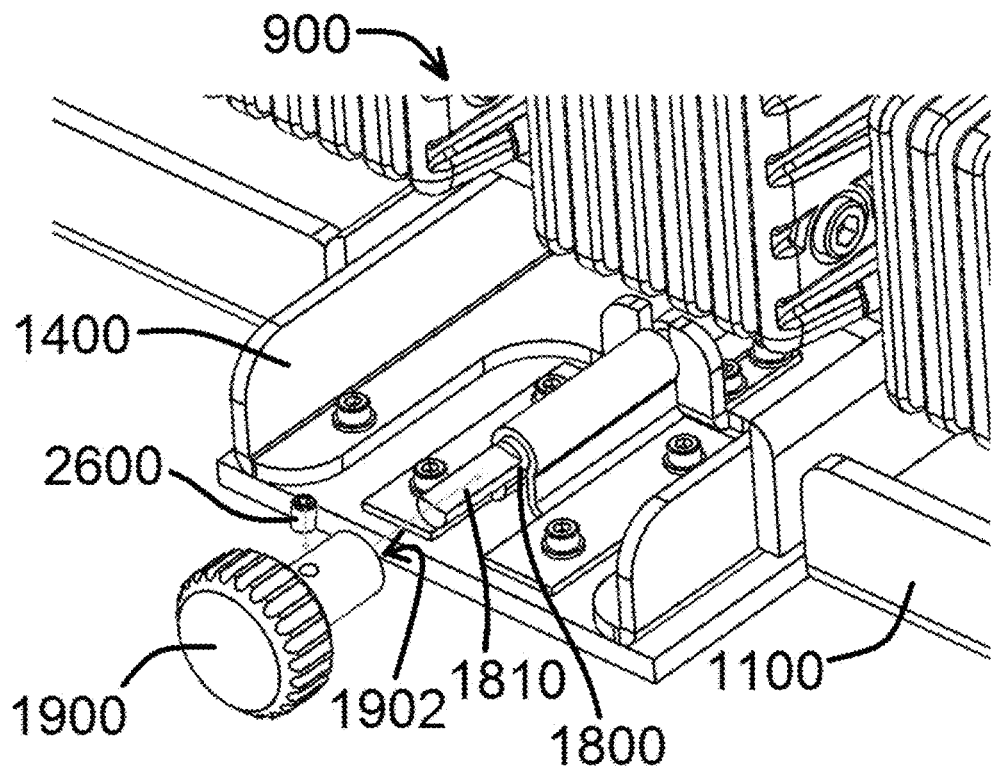
FIG. 26A shows an adjustment knob in the process of being fastened to a worm shaft, according to the present disclosure.
Figure 26B:
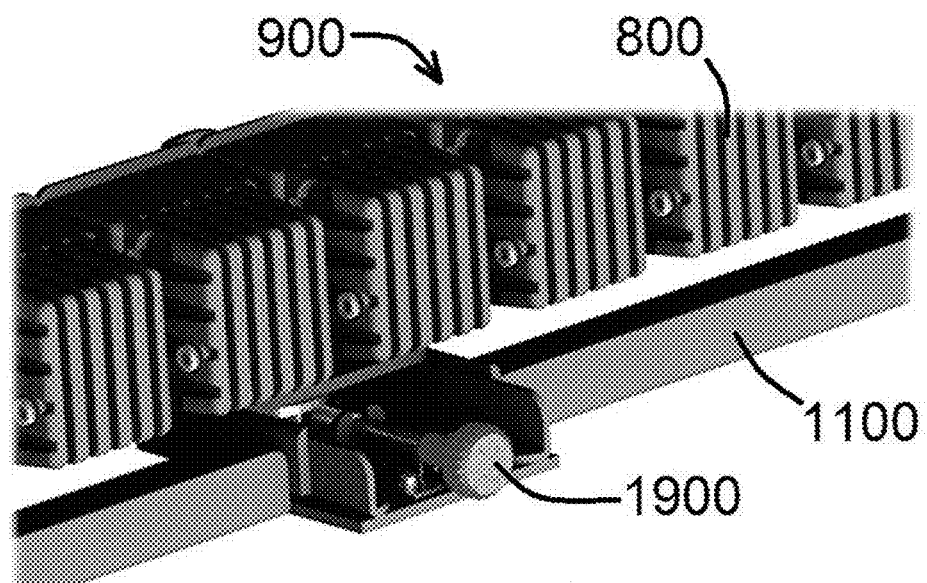
FIG. 26B shows a rear portion of a module system having an adjustment knob coupled thereto, according to the present disclosure.

FIG. 26A shows an exemplary adjustment knob 1900 in the process of being fastened to an exemplary worm shaft 1800 of the present disclosure. As shown therein, a notched end 1810 of worm shaft 1800, also as shown in FIG. 18D, is shown extending from adjuster support 2250, and is configured to be received by a knob aperture 1902 of adjustment knob 1900, also as shown in FIG. 19B. Adjustment knob 1900 can then be fastened to worm shaft 1800 by way of tightening a grub screw 2600 within a threaded aperture 1904 defined within adjustment knob 1900, also as shown in FIG. 19A, so that grub screw 2600 can tightly contact worm shaft 1800 at notched end 1810. FIG. 26B shows a rear portion of an exemplary module system 900 of the present disclosure having adjustment knob 1900 coupled thereto.

Once assembled, turning adjustment knob 1900 in a first direction causes worm shaft 1800 to rotate in a first direction, causing gear assembly 1700 to rotate in a first direction, and ultimately causing pusher 1300 to move flexible plate 1000 in a first direction, such as from convex to less convex, convex to flat, flat to concave, or concave to more concave. Turning adjustment knob 1900 in an opposite second direction causes worm shaft 1800 to rotate in a second direction, causing gear assembly 1700 to rotate in a second direction, and ultimately causing pusher 1300 to move flexible plate 1000 in a second direction, such as from concave to less concave, concave to flat, flat to convex, or convex to more convex.

As generally referenced herein, exemplary module systems 900 of the present disclosure can comprise several LED modules 20, and can be adjusted so that modules 20 direct light in a general perpendicular direction relative to an elongate axis of flexible plate 1000, or to direct light relatively inward (at least using LED modules 20 on the relative ends of flexible plate 1000) when flexible plate 1000 is flexed to form a concave shape, or to direct light relatively outward (at least using LED modules 20 on the relative ends of flexible plate 1000) when flexible plate is flexed to form a convex shape. In view of the same, exemplary module systems 900 of the present disclosure have the ability to overlap light patterns emitted by LED modules 20 (pods) arranged on a beam (coupled to flexible plate 1000), and have ability to adjust the arc radius in order to give the user the ability to focus or spread the light out. Each LED module 20 could also be interchanged to produce different colors, intensity or light output patterns, as may be desired, which is easily accomplished by removing one LED module 20 and replacing it with another LED module.

Prior art LEDs positioned on a flat surface or a surface that is bent in only one direction causes the LEDs perform independently. An LED functioning alone is not bright enough to produce the intensity and result that many situations call for. At least one fundamental concept within the present disclosure includes disclosure of a system that can have 100% of the LED modules 20 of the system to emit overlapping light. If one imagines an LED emits light in a cone shape when used with an optic (reflector or lens), and if those cones are put in a straight line pointing in the same direction, some with overlap to a small degree but the majority of the surface that is being lit ends up being lit by only a small number of LED cones. If that line is bent and point all those LEDs to the same center point, all the cones overlap and the performance of that space is now all the LEDs. The latter is accomplished using the novel devices and systems of the present disclosure, as a single row of LED modules 20 can overlap 100% of the LED output onto one space evenly without spilling light. Some benefits include the following:

a. Even color output: If devices and systems of the present disclosure are used in photography, for example, one can mix and match any number (unlimited) of LED modules 20 and create custom colors of light output. If the photographer wants to add more white or more blue to the mix, he or she can simply change one or more LED modules 20 of a module system 900.

b. Light pattern and coverage: If this is used in a street light and the city wants to only have the light hit the sidewalk without the cars or the houses being exposed to light, they can adjust to focus to cover exactly the area they want. Then if they want the color of the street lights to be different (white instead of yellow) or they want to shape the output in a square instead of a circle, they can change the LED modules 20 for different optics.

Various module systems 900 of the present disclosure can be used for various purposes, such as those described herein, including but not limited to use on trucks, boats and other off-road areas or vehicles. Users of said trucks and boats, for example, would want the light output to be just what they need it for. Sometimes that may be racing which requires extreme spot light with distance and focus being important. Others want wide angled flood patterns for spotting animals that may run in front of them. Boaters want light output that is flood patterned with some focus in the center and no light pointing down to hit the bow and cause glare. Various devices and systems of the present disclosure are configured to allows these customers to interchange LED modules 20 for optics and colors but also bend the beam to focus or spread the light by, for example, turning adjustment knob 1900 to flex flexible plate 1000. The modular choices for optics in view of the adjustable flexing of all LED modules 20 result in total control of light emitted by module systems 900. Any number of components referenced herein in connection with one or more light fixtures 100 or module systems 900 of the present disclosure may be used with the other, such as a component of a light fixture 100 being used with a module system 900, as applicable/desired.

Figure 27:
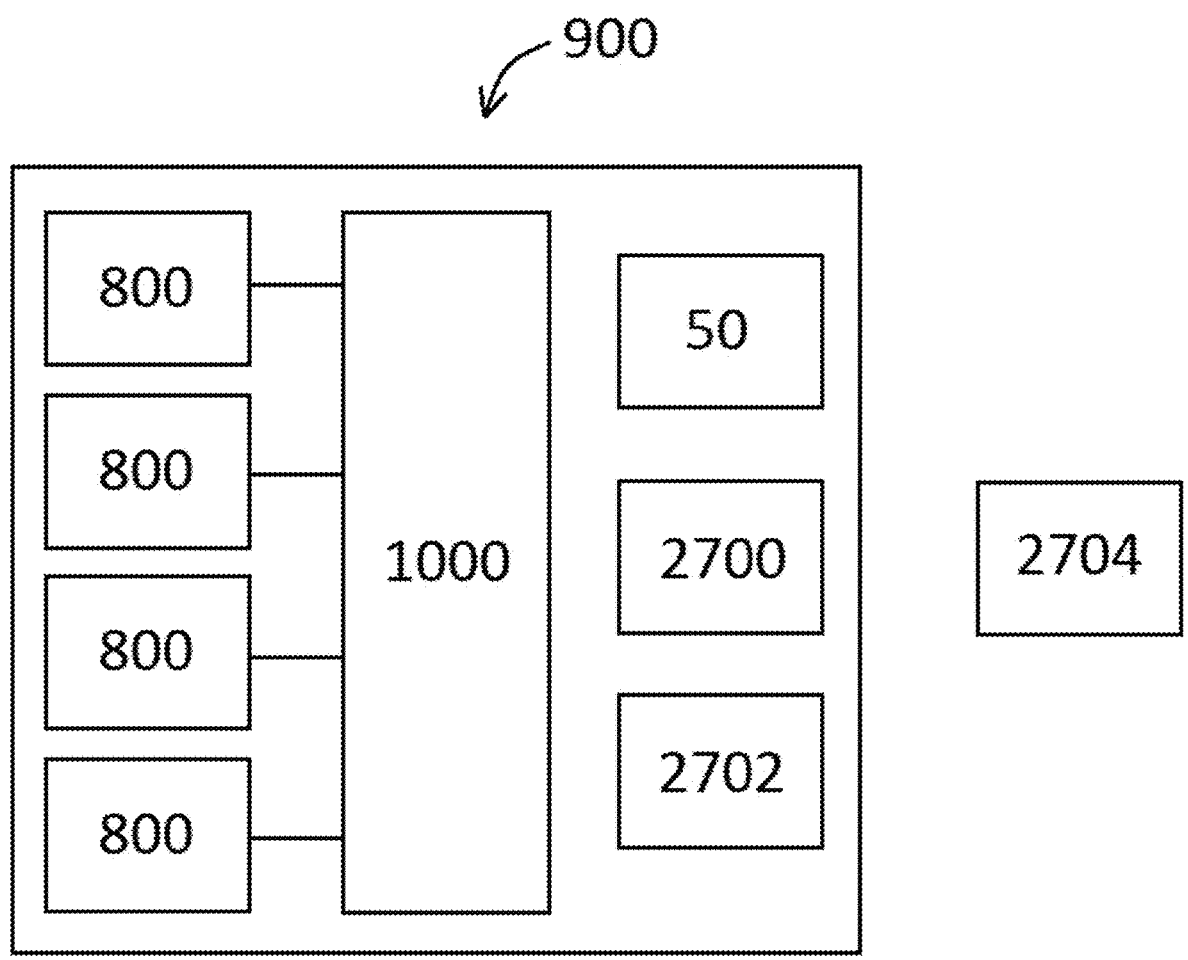
FIG. 27 shows a block component diagram of components of a module system, according to the present disclosure.

As referenced herein exemplary module systems 900 comprise a flexible plate 1000 configured (having the ability) create any convex, concave or planar surface, namely configured to bend in a convex or concave fashion or have a planar (straight) configuration, with any a range of degrees determined/desired by the user, such as part of or a full circumference (360° curvature). Exemplary flexible plates 1000 of the present disclosure can be adjusted manually/mechanically, as referenced herein (such as by way of pusher 1300 and/or other componentry), or remotely, such as by way of a motor 2700 coupled to one or more portions of an exemplary module system 900 of the present disclosure. Motors 2700, as referenced herein and as shown in the block component diagram shown in FIG. 27, are configured to operate by way of a control module 2702 and a power source (controller 50) so that operation of control module 2702 causes motor 2700, powered by power source (controller 50) or another source of power, to operate as desired to cause flexible plate 1000 to move in a desired direction (so to become concave, more concave, convex, more convex, or straight). In at least one embodiment, motor 2700 is in contact with at least one of pusher 1300, a mechanism cradle 1400, a rotary push plate 1500, a gear assembly 1700, a worm shaft 1800, and/or an adjustment knob 1900, so to cause movement of the same to cause flexible plate 1000 to move as desired. Controller 2702 can be operated directly or remotely, such as by way of remote 2704, as shown in FIG. 27, in wired or wireless communication with controller 2702.

Flexible plates 1000 can be made from many types of materials to provide different performance for different environments, such as various metals and/or plastics. Flexible plates 1000 can also be positioned in various locations relative to LED modules 20 depending on the desired use, such as being above, below, in front, or behind said LED modules 20. Flexible plates 1000, as referenced herein, are configured to retain a plurality of LED modules 20, each of which can be mounted and/or powered independently from the other. Flexible plates 1000 can allow for the attachment of each LED module 20 with the ability to remove, exchange or replace each LED module 20 without removing or affecting any other LED module on the flexible plate 1000 (meaning that LED modules 20 can be hot-swappable, in various embodiments).

Flexible plates 1000 of the present disclosure can be built in different patterns to allow for different shapes and sizes of LED modules 20, as referenced herein. LED modules 20, in various embodiments, can be independently connected to a power source, such as one or more controllers 50 configured to provide electrical power to LED modules 20. LED modules 20 can be connected to controller(s) 50 independently, and can comprise/utilize a power connector 60, such as referenced herein, at or as part of each LED module 20 for connecting/disconnecting each LED module 20 with a waterproof connection. In various embodiments, each LED module 20 is completely sealed, waterproof, and independently powered.

In various embodiments, LED modules 20 can be considered as having other light sources aside from LEDs therein. As such, LED module 20 can also be referenced to herein as being a light module 20, with said light modules 20 having one or more characteristics, components, and/or features as LED modules 20 referenced herein, but with a different light source (instead of LED source 22, it would be considered as a light source 22, which would be different than a LED). In view of the same, each light module 20 can comprise any type of light source, optic or power such as to be allowed by the module system 900 with the limitation of engineering restrictions to size, weight and thermal. The modular systems 900 of the present disclosure can also utilize any number of other light sources as can be sourced to be a suitable fit to the flexible plate 1000 so that module systems 900 operate as desired. This allows for the flexible plate 1000, for example, to be considered an editable platform for the control of many different independent modular illumination systems in order to achieve any range of illumination output results due to the vast options available in the form of independent illumination system sources, optics, power inputs (such as variations as different optics angles, different optics, different colors, different wattages, different LEDs, or even have infrared LEDs, etc., to produce/facilitate night vision, as may be desired).

Each module system 900 can be independently controlled to affect operation of each (such as powering on and off, adjusting light intensity from light modules 20, turning on and off components of each light module 20, and the like. The ability to control each light module 20 of a module system 900 would then only be limited by the ability or options of that individual unit. Each light module 20 can be independently controlled through a control module 2702, as referenced herein, via a wired or wireless remote interface (a remote 2704).

Exemplary module systems 900 of the present disclosure can be mounted to many different structures in varying ways, including, but not limited to, vehicles, buildings, towers, handles, or any other structures/substrates or means of mounting to provide a stable operation of the module system 900.

Flexible plates 1000 can be configured to operate in tandem with one or more additional flexible plates 1000 in a stacked or tiered fashion as may be desired, which is only dependent on the number of flexible plates 1000 the user prefers. Each flexible plate 1000 can operate (move, illuminate, etc.) independent of all other flexible plates 1000, but may also act in unison with any other flexible plate via operation of one or more control modules 2702, such as via a wired or wireless interface (using a remote 2704).

While various embodiments of an arc modular LED light fixture and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A light fixture, comprising:
 a plurality of light emitting diode (LED) modules arranged adjacent one another in a side-by-side configuration, each LED module of the plurality of LED modules comprising:
  a heat sink having an internal volume defined by a closed end, a sidewall, and an open end, the heat sink including a plurality of cooling fins extending from the sidewall, and
  an LED source disposed within the internal volume adjacent the closed end of the heat sink, the LED source comprising one or more LEDs; and
 a substrate configured to receive and retain the plurality of LED modules, the substrate selected from the group consisting of a housing, a rigid beam, and a flexible plate wherein the substrate comprises the housing, the housing comprising a back panel and a front panel joined together by one or more side panels and further including one or more vents formed therethrough to enable flow of ambient air into, though, and out of the housing.

2. The light fixture of claim 1, wherein the substrate comprises the housing, the housing comprising a back panel and a front panel joined together by one or more side panels and further including one or more vents formed therethrough to enable flow of ambient air into, through, and out of the housing.

3. The light fixture of claim 1, wherein a relative front of the housing has a concave configuration, and wherein each LED module of the plurality of LED modules directs light inward toward a center point.

4. The light fixture of claim 1, wherein a relative front of the housing has a concave configuration, and wherein each LED module of the plurality of LED modules directs light in a different direction.

5. The light fixture of claim 1, wherein the substrate comprises the rigid plate, and wherein each LED module of the plurality of LED modules is coupled to the flexible plate, the flexible plate coupled to the rigid plate.

6. The light fixture of claim 5, wherein the flexible plate can be configured to form a concave shape relative to the rigid plate, and wherein each LED module of the plurality of LED modules directs light inward toward a center point.

7. The light fixture of claim 5, wherein the flexible plate can be configured to form a convex shape relative to the rigid plate, and wherein each LED module of the plurality of LED modules directs light in a different direction.

8. The light fixture of claim 1, wherein the substrate comprises the flexible plate, and wherein each LED module of the plurality of LED modules is coupled to the flexible plate.

9. The light fixture of claim 8, wherein the flexible plate can be configured to form a concave shape, and wherein each LED module of the plurality of LED modules directs light inward toward a center point.

10. The light fixture of claim 8, wherein the flexible plate can be configured to form a convex shape, and wherein each LED module of the plurality of LED modules directs light in a different direction.

11. The light fixture of claim 1, configured so to permit an LED module of the plurality of LED modules to be removed and replaced with another LED module while the remaining LED modules of the plurality of LED modules are operable to emit light therefrom.

12. The light fixture of claim 1, wherein the LED source comprises a plurality of LEDs, wherein at least one LED of the plurality of LEDs is configured to emit red light at wavelengths between 610 and 760 nanometers.

13. The light fixture of claim 12, wherein another LED of the plurality of LEDs is configured to emit orange light at wavelengths between 590 and 610 nanometers, and wherein yet another LED of the plurality of LEDs is configured to emit blue light at wavelengths between 450 and 500 nanometers.

* * * * *